US011625562B2

(12) United States Patent
Huber et al.

(10) Patent No.: US 11,625,562 B2
(45) Date of Patent: Apr. 11, 2023

(54) SYSTEM AND METHOD FOR HUMAN-MACHINE HYBRID PREDICTION OF EVENTS

(71) Applicant: HRL LABORATORIES, LLC, Malibu, CA (US)

(72) Inventors: David J. Huber, Calabasas, CA (US); Tsai-Ching Lu, Thousand Oaks, CA (US); Nigel D. Stepp, Santa Monica, CA (US); Aruna Jammalamadaka, Malibu, CA (US); Hyun J. Kim, Malibu, CA (US); Samuel D. Johnson, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 602 days.

(21) Appl. No.: 16/708,166

(22) Filed: Dec. 9, 2019

(65) Prior Publication Data
US 2020/0257943 A1  Aug. 13, 2020

Related U.S. Application Data

(60) Provisional application No. 62/815,304, filed on Mar. 7, 2019, provisional application No. 62/804,016, filed on Feb. 11, 2019.

(51) Int. Cl.
*G06F 40/166* (2020.01)
*G06K 9/62* (2022.01)
(Continued)

(52) U.S. Cl.
CPC ......... *G06K 9/6289* (2013.01); *G06F 16/907* (2019.01); *G06F 16/90335* (2019.01);
(Continued)

(58) Field of Classification Search
None
See application file for complete search history.

(56) References Cited

U.S. PATENT DOCUMENTS 10,372,132 B2 * 8/2019 Herz .................... G05D 1/0088
2002/0181773 A1 * 12/2002 Higaki .................. G06V 40/20
715/863
(Continued)

FOREIGN PATENT DOCUMENTS

WO  WO 2015/183255 A1  12/2015
WO  WO 2017/106559 A1  6/2017

OTHER PUBLICATIONS

International Search Report and Written Opinion for International Application No. PCT/US2019/065286, dated Feb. 18, 2020, 12 pages.
(Continued)

*Primary Examiner* — Seong-Ah A Shin
(74) *Attorney, Agent, or Firm* — Lewis Roca Rothgerber Christie LLP

(57) ABSTRACT

A method for generating human-machine hybrid predictions of answers to forecasting problems includes: parsing text of an individual forecasting problem to identify keywords; generating machine models based on the keywords; scraping data sources based on the keywords to collect scraped data relevant to the individual forecasting problem; providing the scraped data to the machine models; receiving machine predictions of answers to the individual forecasting problem from the machine models based on the scraped data; providing, by the computer system via a user interface, the scraped data to human participants; receiving, by the computer system via the user interface, human predictions of answers to the individual forecasting problem from the human participants; aggregating the machine predictions with the human predictions to generate aggregated predic-
(Continued)

tions; and generating and outputting a hybrid prediction based on the aggregated predictions.

20 Claims, 24 Drawing Sheets

(51) Int. Cl.

| | |
|---|---|
| *G06F 16/907* | (2019.01) |
| *G06N 20/00* | (2019.01) |
| *G06F 40/284* | (2020.01) |
| *G06F 40/205* | (2020.01) |
| *G06N 3/08* | (2023.01) |
| *G06F 16/903* | (2019.01) |
| *G06F 40/40* | (2020.01) |
| *G06Q 30/0202* | (2023.01) |
| *G06Q 30/0251* | (2023.01) |
| *G06Q 50/00* | (2012.01) |

(52) U.S. Cl.
CPC .......... *G06F 40/166* (2020.01); *G06F 40/205* (2020.01); *G06F 40/284* (2020.01); *G06F 40/40* (2020.01); *G06N 3/08* (2013.01); *G06N 20/00* (2019.01); *G06Q 30/0202* (2013.01); *G06Q 30/0255* (2013.01); *G06Q 50/01* (2013.01)

(56) References Cited

U.S. PATENT DOCUMENTS

| | | | | |
|---|---|---|---|---|
| 2013/0096892 | A1* | 4/2013 | Essa | G09B 7/00 703/2 |
| 2015/0302315 | A1* | 10/2015 | Ahn | G06F 16/00 706/46 |
| 2016/0005055 | A1* | 1/2016 | Sarferaz | G06Q 10/04 705/7.31 |
| 2016/0096270 | A1* | 4/2016 | Ibarz Gabardos | B25J 9/163 901/3 |
| 2017/0046459 | A1* | 2/2017 | Schmedlen | G09B 19/00 |
| 2017/0206452 | A1* | 7/2017 | Herzog | G06N 5/04 |
| 2017/0316324 | A1* | 11/2017 | Barrett | G06N 20/20 |
| 2020/0257943 | A1* | 8/2020 | Huber | G06N 3/084 |

OTHER PUBLICATIONS

"HFC-MATRICS Episode 01: What is Hybrid Forecasting?" Jun. 11, 2018 retrieved from the Internet: URL:https://www.youtube.com/watch?v=hWmKwsB_VtE.

Scott, Steven L., et al., "Predicting the Present with Bayesian Structural Time Series," Available at SSRN 2304426 (2013), 21 pages.

Arora, Sanjeeve, et al., "The Multiplicative Weights Update Method: A Meta-Algorithm and Applications," Theory of Computing 8.1 (2012), pp. 121-164.

Chen, Yiling, et al., "Randomized Wagering Mechanisms," Proceedings of the AAAI Conference on Artificial Intelligence. vol. 33, 2019, pp. 1845-1852.

Forlines, Clifton, et al., "Heuristics for Improving Forecast Aggregation," 2012 AAAI Fall Symposium Series, 2012, 5 pages.

Tetlock, Philip E., et al., "Bringing probability judgments into policy debates via forecasting tournaments," Science 355.6324 (2017): 481-483.

Xu, Jiejun, et al., "Civil unrest prediction: A tumblr-based exploration," International Conference on Social Computing, Behavioral-Cultural Modeling, and Prediction, Springer, Cham, 2014, 8 pages.

Compton, Ryan, et al., "Using publicly visible social media to build detailed forecasts of civil unrest," Security informatics 3.1 (2014): 4, 10 pages.

Rasouli, Kabir, et al., "Daily streamflow forecasting by machine learning methods with weather and climate inputs," Journal of Hydrology 414-415 (2012), pp. 284-293.

Kennedy, Ryan, et al., "Trust in Public Policy Algorithms," Available at SSRN 3339475 (2018), 36 pages.

Chang, Welton, et al., "Accountability and adaptive performance under uncertainty: A long-term view," Judgment & Decision Making 12.6 (2017), 17 pages.

Chang, Welton, et al., "Restructuring structured analytic techniques in intelligence," Intelligence and National Security, 33(3), 337-356.

Liu, Yang, et al., "Surrogate Scoring Rules and a Dominant Truth Serum for Information Elicitation," arXiv preprint arXiv:1802.09158, 25 pages.

Cassidy, M., "Centaur Chess Shows Power of Teaming Human and Machine," Huffpost Technology, https://huffpost.com/entry/centaur-chess-shows-power_b_6383606, 2015, 9 pages.

Kasparov, Gary, "The Chess Master and the Computer," The New York Review of Books, 57(2), 16-19, https://www.nybooks.com/articles/2010/02/11/the-chess-master-and-the-computer/, 2010, 10 pages.

Rostami, Mohammad, et al., "A Crowdsourcing Triage Algorithm for Geopolitical Event Forecasting," Proceedings of the 12th ACM Conference on Recommender Systems, https://dl.acm.org/doi/10.114/3240323.3240385, 2018, 5 pages.

Compton, Ryan, et al., "Detecting future social unrest in unprocessed Twitter data: Emerging Phenomena and Big Data," In Intelligence and Security Informatics (ISI), 2013 IEEE International Conference On (pp. 56-60), IEEE.

Gneiting, Tilmann, et al., "Weather forecasting with ensemble methods," Science, 310 (5746), https://science.sciencemag.org/content/310/5746/248, 2005, pp. 248-249.

* cited by examiner

How much X will be produced by MM/DD/YYYY?
Less than 750
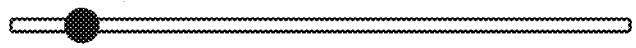
Between 750 and 900
More than 900 but less than 1050
More than 1050
Rationale:
FIG. 4

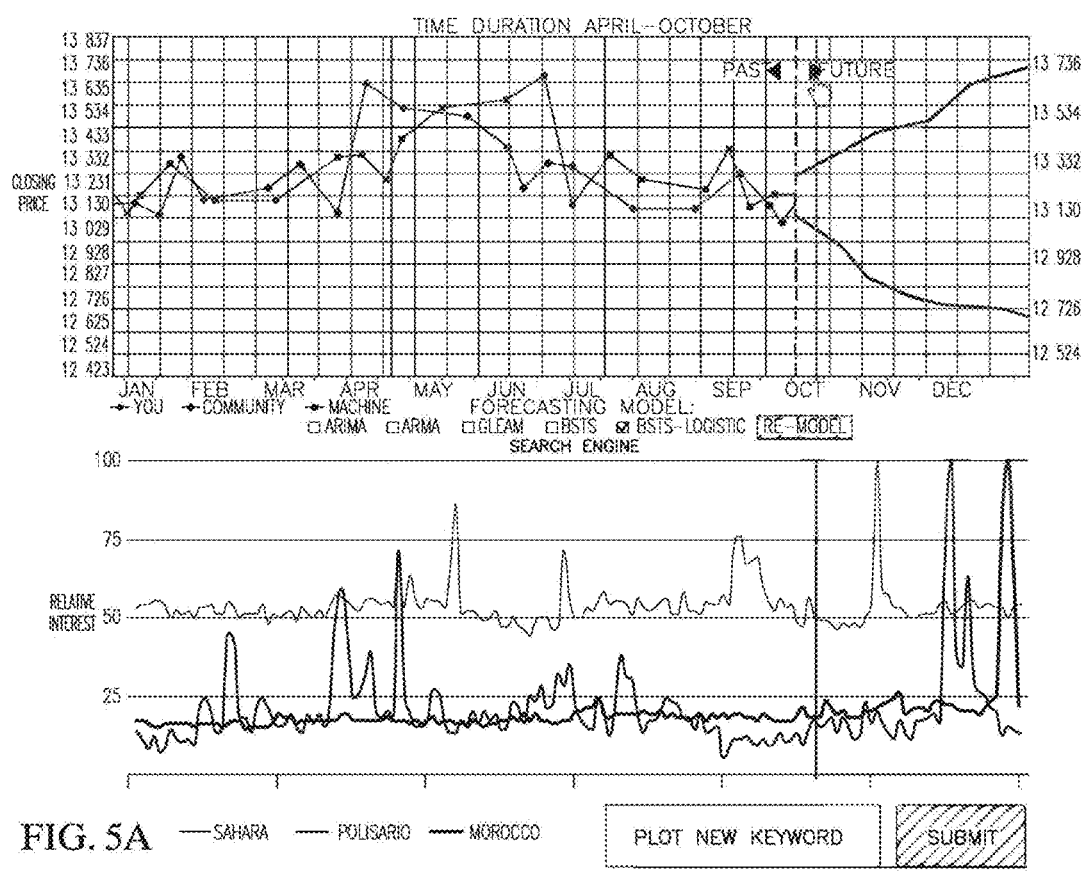

| Rank | Team Name | Accuracy | Active Members | Active Questions | Activity Score |
|---|---|---|---|---|---|
| 1 | Team Turker 6 | 0.6051 | 0 | 27 | 444.74 |
| 2 | Team Turker 24 | 0.6019 | 1 | 30 | 502.29 |
| 3 | Team Turker 10 | 0.5976 | 0 | 32 | 1486.98 |
| 4 | Team Turker 17 | 0.5843 | 0 | 34 | 2095.72 |
| 5 | Team Turker 28 | 0.5707 | 0 | 27 | 1653.27 |
| 6 | Team Turker 1 | 0.5634 | 0 | 34 | 1212.47 |
| 7 | Team Turker 14 | 0.5509 | 1 | 33 | 1756.88 |
| 8 | Team Turker 5 | 0.5457 | 1 | 32 | 1865.27 |
| 9 | Team Turker 15 | 0.5432 | 1 | 32 | 973.47 |
| 10 | Team Turker 4 | 0.5327 | 1 | 32 | -856.73 |
| 11 | Team Turker 21 | 0.5304 | 0 | 36 | 2545.40 |
| 12 | Team Midnight | 0.5294 | 17 | 36 | -18.49 |
| 13 | Team Turker 11 | 0.5280 | 0 | 33 | 3248.88 |

FIG. 6B

FLASHCARDS

Which domain best describes this question?

The MATRICS system would like some help placing this question into the right domain. Please select the one you think is best.

Will the Government of Canada issue a travel advisory of "Avoid all travel" for Nicaragua between 29 June 2018 and 31 August 2018?

Politics / International Relations

Natural Science / Climate

Macroeconomics / Finance

Elections

Health / Disease

FIG. 6D

WILL SYRIA'S
PRESIDENT BASHAR
AL-ASSAD EXPERIENCE
A SIGNIFICANT
LEADERSHIP
DISRUPTION BEFORE 1
SEPTEMBER 2018?

KEYWORD VOTING

Click ⬇ ⬆ to vote.

⬆ 1 leadership ⬆ 1 assad ⬇ ⬇

⬆ 1 syria ⬆ 1 disruption ⬇ ⬇

⬆ significant
0 leadership    ⬆ 0 president
⬇ disruption    ⬇

⬆ 0 bashar     ⬆ -1 bashar al-assad
⬇              ⬇

FIG. 6E

FIG. 8    YOUR RECENT FORECAST
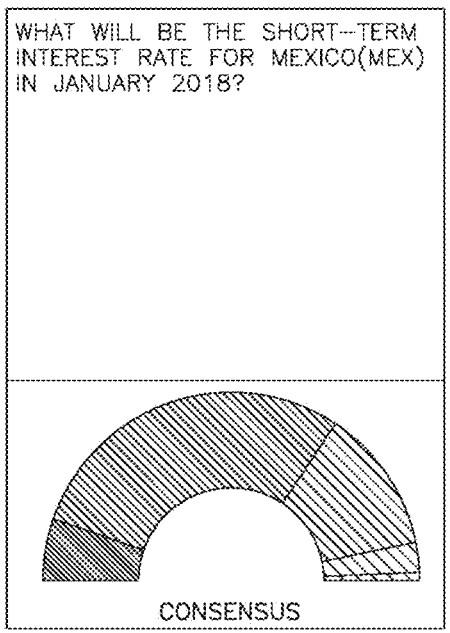
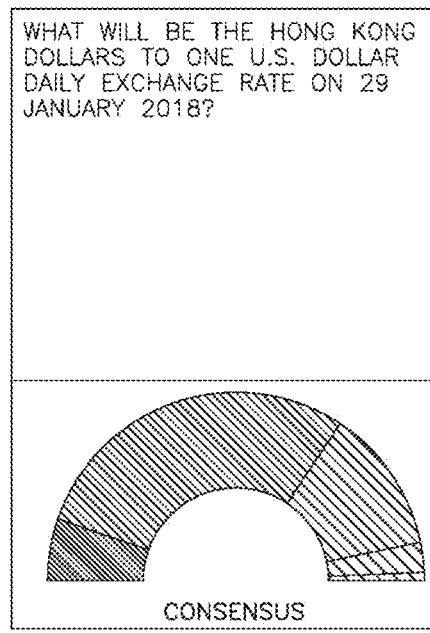

SYSTEM AND METHOD FOR HUMAN-MACHINE HYBRID PREDICTION OF EVENTS

CROSS-REFERENCE TO RELATED APPLICATION(S)

This application claims priority to and the benefit of U.S. Provisional Patent Application. No. 62/804,016, filed in the United States Patent and Trademark Office on Feb. 11, 2019 and U.S. Provisional Patent Application. No. 62/815,304, filed in the United States Patent and Trademark Office on Mar. 7, 2019, the entire disclosures of which are incorporated by reference herein.

STATEMENT REGARDING FEDERALLY SPONSORED RESEARCH OR DEVELOPMENT

The present invention was made with support from the United States Government under contract no. 2017-17061500006 issued by the Intelligence Advanced Research Projects Activity. The United States Government has certain rights in this invention.

FIELD

Aspects of embodiments of the present invention relate to human-machine hybrid prediction systems and methods for predicting events using hybrids of human predictors and machine predictors, and user interfaces therefor.

BACKGROUND

Predicting the timing or outcomes of future events is a common occurrence. For example: meteorologists predict the weather in various localities based on measurements of current conditions; sports analysts predict the outcomes of tournaments based on their assessments of the various teams; and political analysts predict the outcomes of elections based on polling data and the behavior of the candidates.

Human-only forecasting systems have recently gained new attention as a way to make predictions about future events through crowdsourcing. While the results of the forecasts from crowdsourcing are often relatively accurate, the human participants introduce some weaknesses such as: fatigue, slow processing and analysis, research time, and cognitive bias. These comparative systems have limited scalability; they are limited by the number of forecasting problems that the crowd can process concurrently and generally do not include a method for assigning or organizing which human participants (human predictors) answer which questions. Additionally, some comparative methods do not employ any type of machine research or data display and also require more time from the human participants to perform research, which may be redundant across participants (e.g., when forecasting gold prices, all human participants would look up the historical price of gold independently of one another, thereby duplicating work and wasting time).

Machine-only forecasting systems have also been implemented. However, machine-only forecasting systems also exhibit what is called the "cold-start problem," in which the accuracy of the system is extremely limited or reduced when a new problem is introduced and remains low until the system has accumulated enough data to understand the problem. This contributes to the rigidity of machine-only forecasting systems by slowing down the rate at which the system can adapt to new problems and topic areas.

SUMMARY

Aspects of embodiments of the present invention relate to human-machine hybrid forecasting and prediction of various events. Some embodiments use a combination of crowdsourcing and human collaboration, machine learning, and adaptive aggregation across an ensemble of prediction strategies. Some aspects of embodiments of the present invention relate to a three-pronged approach that allows analyses from humans and analyses from machines (e.g., computational models) to interact and aid one another in the overall prediction task.

Some aspects of embodiments of the present invention relate to methods of machine-aided human forecasting that leverage baseline machine models, machine learning, and time-series modeling to provide initial information about a task to the participant and a research pathway to discover more.

Some aspects of embodiments of the present invention relate to methods of human-aided machine forecasting that leverage human participation to detect anomalies in the machine learning output (e.g., drift, errors, etc.), and provide controls for humans to adjust the parameters of the machine learning algorithms and models. This may be used to overcome the "cold start" problem for running machine leaning algorithms on new task topic areas.

Some aspects of embodiments of the present invention relate to methods of human-machine aggregation, including quantifying the human and machine inputs to the system, how the human and machine inputs relate to each other, and how they can be combined to improve the output of the overall system (e.g., improving prediction accuracy, recall, and precision).

Some aspects of embodiments of the present invention relate to adaptive methods of human and machine forecast aggregation that learn from prior performance of the elements of the ensemble and adjust the weights of each accordingly.

Some aspects of embodiments of the present invention relate to systems and methods for providing user interfaces to connect human participants (e.g., expert analysts) with machine learning algorithms and models of the system.

According to one embodiment of the present invention, a method for generating human-machine hybrid predictions of answers to forecasting problems includes: parsing, by a computer system, text of an individual forecasting problem (IFP) to identify a plurality of keywords; generating, by the computer system, one or more machine models based on the keywords; scraping, by the computer system, one or more data sources based on the keywords to collect scraped data relevant to the individual forecasting problem; providing, by the computer system, the scraped data to the one or more machine models; receiving, by the computer system, one or more machine predictions of answers to the individual forecasting problem from the one or more machine models based on the scraped data; providing, by the computer system via a user interface, the scraped data to one or more human participants; receiving, by the computer system via the user interface, one or more human predictions of answers to the individual forecasting problem from the one or more human participants; aggregating, by the computer system, the one or more machine predictions with the one or more human predictions to generate aggregated predictions; and generating and outputting, by the computer system, a hybrid prediction based on the aggregated predictions.

The one or more machine models may include a Bayesian structural time series (BSTS) model.

The one or more machine models may include: a disease model, an election model, or a civil unrest model.

The method may further include: providing the keywords to the human participants via the user interface; and receiving votes on the keywords from the human participants via the user interface, wherein the scraping the data sources is performed in accordance with the votes on the keywords.

The method may further include displaying a machine prediction computed by a machine model of the one or more machine models to a human participant of the one or more human participants via the user interface.

The method may further include displaying the scraped data supplied to the machine model to compute the machine prediction.

The method may further include receiving a selection of a portion of the scraped data supplied to the machine model.

The method may further include recomputing the machine prediction using the machine model based on the selection of the portion of the scraped data.

The method may further include: receiving one or more human participant rationales, each corresponding to one of the one or more human predictions; and displaying the one or more human participant rationales in the user interface in association with the corresponding human predictions.

The method may further include: scraping, by the computer system, the one or more data sources based on the keywords to collect new scraped data relevant to the individual forecasting problem; and detecting a significant change in the new scraped data compared to the scraped data.

The method may further include, in response to detecting the significant change in the new scraped data compared to the scraped data: providing the new scraped data to the one or more machine models; and receiving one or more updated machine predictions from the one or more machine models based on the new scraped data.

The method may further include, in response to detecting the significant change in the new scraped data compared to the scraped data: alerting the one or more human participants regarding the new scraped data; displaying the new scraped data to the one or more human participants; and receiving one or more updated human predictions from the one or more human participants.

The individual forecasting problem may be assigned to the one or more human participants of a plurality of human participants by: computing a participant skill vector for each of the plurality of human participants based on a plurality of prior responses to a plurality of prior individual forecasting problems; comparing the participant skill vector of each of the plurality of human participants to the individual forecasting problem to compute a plurality of participant-IFP match scores; identifying a plurality of participant-IFP match scores satisfying a threshold; and assigning the individual forecasting problem to the one or more human participants, wherein the participant-IFP match scores corresponding to the one or more human participants satisfy the threshold.

The one or more human participants may further be selected in response to a low prior response rate to the individual forecasting problem.

The generating the hybrid prediction may include: applying weights to the one or more human predictions and the one or more machine predictions to compute weighted human predictions and weighted machine predictions; and computing the hybrid prediction based on a combination of the weighted human predictions and the weighted machine predictions.

The computing the hybrid prediction may include supplying the one or more human predictions and the one or more machine predictions to an artificial neural network configured with the weights.

The method may further include: receiving, by the computer system from the one or more machine models, one or more machine confidence scores, each of the machine confidence scores corresponding to one of the one or more machine predictions; and receiving, by the computer system via the user interface, from the one or more human participants, one or more participant confidence scores, each of the participant confidence scores corresponding to one of the one or more human predictions, wherein each of the weights associated with the one or more machine predictions is computed based on a corresponding one of the machine confidence scores, and wherein each of the weights associated with the one or more human predictions is computed based on a corresponding one of the participant confidence scores.

According to one embodiment of the present invention, a computer system for generating human-machine hybrid predictions of answers to forecasting problems includes: one or more processors; and one or more computer memory units storing instructions that, when executed by the one or more processors, cause the one or more processors to: parse text of an individual forecasting problem (IFP) to identify a plurality of keywords; generate one or more machine models based on the keywords; scrape one or more data sources based on the keywords to collect scraped data relevant to the individual forecasting problem; provide the scraped data to the one or more machine models; receive one or more machine predictions of answers to the individual forecasting problem from the one or more machine models based on the scraped data; provide, via a user interface in communication with the one or more processors, the scraped data to one or more human participants; receive, via the user interface, one or more human predictions from the one or more human participants; aggregate the one or more machine predictions with the one or more human predictions to generate aggregated predictions; and generate and output a hybrid prediction based on the aggregated predictions.

The one or more machine models may include a Bayesian structural time series (BSTS) model.

The one or more machine models may include: a disease model, an election model, or a civil unrest model.

The one or more computer memory units may further store instructions that, when executed by the one or more processors, cause the processor to: providing the keywords to the human participants via the user interface; and receiving votes on the keywords from the human participants via the user interface, wherein the scraping the data sources is performed in accordance with the votes on the keywords.

The one or more computer memory units may further store instructions that, when executed by the one or more processors, cause the processor to display a machine prediction computed by a machine model of the one or more machine models to a human participant of the one or more human participants via the user interface.

The one or more computer memory units may further store instructions that, when executed by the one or more processors, cause the processor to display the scraped data supplied to the machine model to compute the machine prediction.

The one or more computer memory units may further store instructions that, when executed by the one or more processors, cause the processor to receive a selection of a portion of the scraped data supplied to the machine model.

The one or more computer memory units may further store instructions that, when executed by the one or more processors, cause the processor to recompute the machine prediction using the machine model based on the selection of the portion of the scraped data.

The one or more computer memory units may further store instructions that, when executed by the one or more processors, cause the processor to: receive one or more human participant rationales, each corresponding to one of the one or more human predictions; and display the one or more human participant rationales in the user interface in association with the corresponding human predictions.

The one or more computer memory units may further store instructions that, when executed by the one or more processors, cause the processor to: scrape the one or more data sources based on the keywords to collect new scraped data relevant to the individual forecasting problem; and detect a significant change in the new scraped data compared to the scraped data.

The one or more computer memory units may further store instructions that, when executed by the one or more processors, cause the processor to, in response to detecting the significant change in the new scraped data compared to the scraped data: provide the new scraped data to the one or more machine models; and receive one or more updated machine predictions from the one or more machine models based on the new scraped data.

The one or more computer memory units may further store instructions that, when executed by the one or more processors, cause the processor to, in response to detecting the significant change in the new scraped data compared to the scraped data: alert the one or more human participants regarding the new scraped data; display the new scraped data to the one or more human participants; and receive one or more updated human predictions from the one or more human participants.

The individual forecasting problem may be assigned to the one or more human participants of a plurality of human participants by: computing a participant skill vector for each of the plurality of human participants based on a plurality of prior responses to a plurality of prior individual forecasting problems; comparing the participant skill vector of each of the plurality of human participants to the individual forecasting problem to compute a plurality of participant-IFP match scores; identifying a plurality of participant-IFP match scores satisfying a threshold; and assigning the individual forecasting problem to the one or more human participants, wherein the participant-IFP match scores corresponding to the one or more human participants satisfy the threshold.

The one or more human participants may further be selected in response to a low prior response rate to the individual forecasting problem.

The instructions that cause the processor to generate the hybrid prediction comprise instructions that, when executed by the processor, cause the processor to: apply weights to the one or more human predictions and the one or more machine predictions to compute weighted human predictions and weighted machine predictions; and compute the hybrid prediction based on a combination of the weighted human predictions and the weighted machine predictions.

The one or more computer memory units may further store instructions that, when executed by the one or more processors, cause the processor to compute the hybrid prediction by supplying the one or more human predictions and the one or more machine predictions to an artificial neural network configured with the weights.

The one or more computer memory units further store instructions that, when executed by the one or more processors, cause the processor to: receive, by the computer system from the one or more machine models, one or more machine confidence scores, each of the machine confidence scores corresponding to one of the one or more machine predictions; and receive, by the computer system via the user interface, from the one or more human participants, one or more participant confidence scores, each of the participant confidence scores corresponding to one of the one or more human predictions, wherein each of the weights associated with the one or more machine predictions is computed based on a corresponding one of the machine confidence scores, and wherein each of the weights associated with the one or more human predictions is computed based on a corresponding one of the participant confidence scores.

According to one embodiment of the present invention, a non-transitory computer readable medium has program instructions stored thereon that, when executed by a processor, cause the processor to: parse text of an individual forecasting problem (IFP) to identify a plurality of keywords; generate one or more machine models based on the keywords; scrape one or more data sources based on the keywords to collect scraped data relevant to the individual forecasting problem; provide the scraped data to the one or more machine models; receive one or more machine predictions of answers to the individual forecasting problem from the one or more machine models based on the scraped data; provide, via a user interface in communication with the one or more processors, the scraped data to one or more human participants; receive, via the user interface, one or more human predictions from the one or more human participants; aggregate the one or more machine predictions with the one or more human predictions to generate aggregated predictions; and generate and output a hybrid prediction based on the aggregated predictions.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is an example of a user interface, according to one embodiment of the present invention, for responding to a question "How much X will be produced by MM/DD/YYYY?" where four sliders are provided to indicate relative probabilities of each of four answers: "Less than 750"; "Between 750 and 900"; "More than 900 but less than 1050"; and "More than 1050."

FIG. 5A depicts a user interface according to one embodiment of the present invention showing time series data of predictions of the price of a commodity over time and Google® Trends data showing relative interest in keywords over time.

FIG. 6B is an example of a system leaderboard according to one embodiment of the present invention.

FIG. 6D is a screenshot of a user interface according to one embodiment of the present invention, displaying a flashcard asking the user to classify the forecasting question "Will the Government of Canada issue a travel advisory of 'Avoid all travel' for Nicaragua between 29 Jun. 2018 and 31 Aug. 2018?" with five potential topics: "Politics/International Relations"; "Natural Science/Climate"; "Macroeconomics/Finance"; "Elections"; and "Health/Disease."

FIG. 6E depicts an example of a user interface for keyword suggestion and voting according to one embodiment of the present invention.

FIG. 8 is a depiction of a participant dashboard of a user interface according to one embodiment of the present invention.

DETAILED DESCRIPTION

Figure 1A:
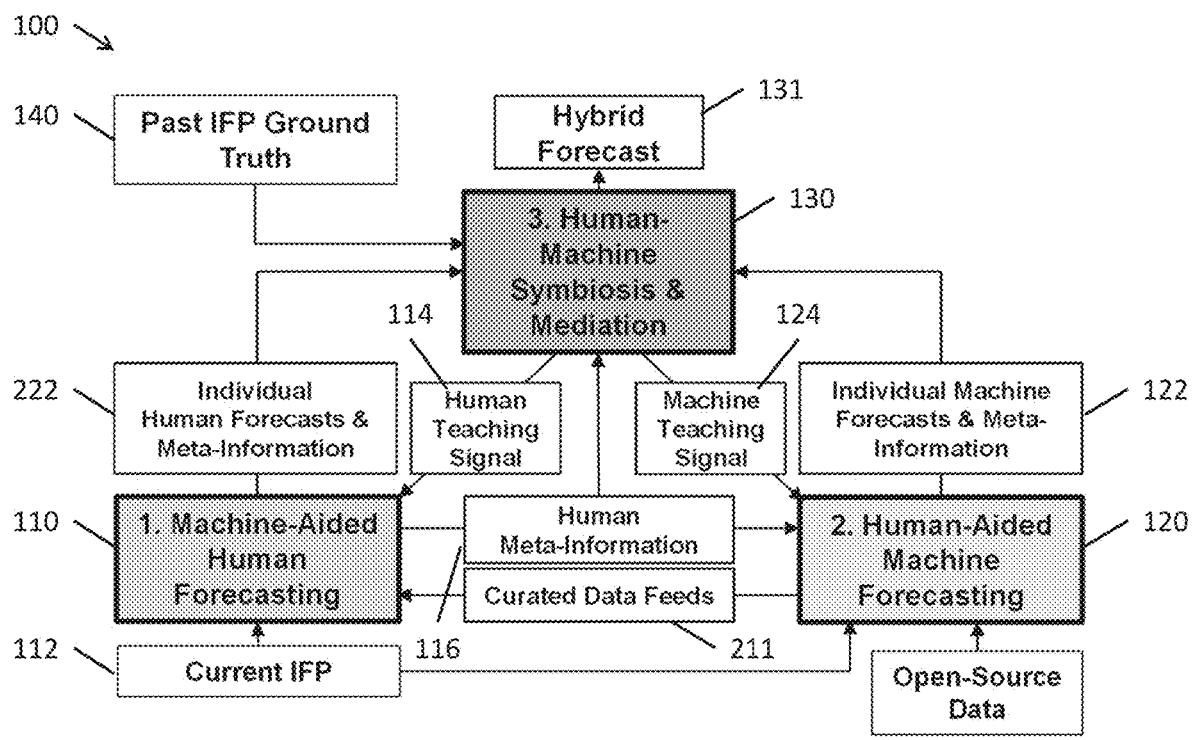
FIG. 1A is a system block diagram of a hybrid forecasting system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present invention relate to human and machine collaboration. Machines can tirelessly execute algorithms to perform many tasks that used to be the domain of humans, and new methods of machine learning and automation continue to improve the performance of such machine implemented algorithms. In addition, there are many tasks in which humans perform well, such as adapting to new situations and creatively integrating information from multiple data sources. Comparative machine learning techniques do not handle these types of tasks well.

Hybridizing human and machine efforts in accordance with embodiments of the present invention provides advantages by leveraging the tirelessness and rigidity of the machine and the clever and imaginative, but fatigue- and bias-prone, human. In some embodiments of the present invention, human participants interact with machine components that gather data, perform analysis, and present actionable intelligence and then make some sort of decision or judgment based on the information provided.

Aspects of embodiments of the present invention are directed to systems and methods for making forecasts or predictions using hybrid contributions from human participants (or experts) and computational models (e.g., machine learning models). In general, embodiments of the present invention may be used in circumstances that involve the prediction of future events. Examples including predicting: a future stock or commodity price (finance); demand for a product (advertising, manufacturing); demand for a specific part for a vehicle; time of failure of machinery (e.g., in manufacturing or commercial travel); whether there will be traffic at a certain time (such as after a sporting event); how long it will take to get from one point to another at a given time (e.g., beyond the simple models currently in use by comparative traffic estimation systems); sentiment analysis for a product—how a crowd feels about a product and its future (advertising); and the likelihood of geopolitical conflict or peace (e.g., as pertaining to politics or business). Aspects of embodiments of the present invention relate to assisting in discourse between participants (e.g., human experts) which might be used to differentiate between valid news sources and fabricated ones.

Generally, comparative forecasting systems that use human and machine inputs to generate hybrid outputs are very simple in their interactions between the two types of inputs. For example, weather forecasting systems may involve a series of algorithms that analyze data for a specific problem (predicting the weather) and then pass this data on to a human analyst, who uses this information as actionable intelligence. The human operator uses this information to inform their decisions or predictions, but the algorithms do not contribute to the final prediction beyond providing information to the human. Another example of human-machine hybrid systems that have shown success in practice are used in "freestyle chess." In this scenario, teams of humans and computers compete in chess matches against each other. A computer analyzes the board, performs statistical computations from the state data it collects and its own memory, and presents a condensed version of the processed information to its operator, who then uses that information to make a move on the board. After the move, the computer updates its algorithms to take the new state information into account and repeats the process. This type of interactive behavior between humans and machines in a system is similar to the interplay between a driver and a GPS smartphone application while driving—the algorithm provides instructions, the operator follows them, and then the algorithm adjusts based on the vehicle's current position, road conditions, and deviations from the path to continuously update the instructions.

However, these comparative systems do not provide the opportunity for the human and computer components to learn from each other and to improve each other's performance. For example, in each of the above applications, an algorithm is trained to perform a specific task and is pre-programmed to search for data in appropriate locations. The algorithm processes this data and presents the human user with a condensed version of the information, which they can use or discard at their discretion. The algorithm adjusts to this behavior and provides new information in a continuous loop until the task is completed. In these comparative systems, the computer system does not aggregate computer or machine predictions with human predictions to arrive at hybrid predictions. Furthermore, in these comparative systems, the computer system does not become better at its task by parsing feedback from the human operator. These systems are also very specialized to a single task and are not easily generalizable to similar tasks, even with human guidance.

Accordingly, aspects of embodiments of the present invention are directed to systems and methods for performing forecasting, prediction, and collaboration (among human forecasters and between human and machine forecasters) by combining inputs from human forecasters (e.g., through crowdsourcing or aggregating multiple human opinions) with inputs from machine learning based forecasters. Aspects of embodiments of the present invention relate to algorithms for human-machine hybrid prediction by analyzing the performance and behavior of the human and machine elements of the system and generating predictions based on both the human and machine elements.

In addition, some aspects of embodiments of the present invention provide connectivity between the human and machine entities within the system. This degree of connectivity allows the machine learning components to inform and assist human experts or forecasters in making their predictions.

Aspects of embodiments of the present invention also relate to allowing the human experts to provide feedback to the machine learning components to improve the performance of the machine learning components based on the human input. These human inputs may include accepting new data sources or new interpretations of existing data sources (e.g., removal of outlier data points and adjustment of training windows). This not only allows the machine to become better at its task, but also to adjust to similar tasks by leveraging human guidance.

Aspects of embodiments of the present invention also relate to engaging human participants and reducing attrition among the participants through combinations of gamification and group competition with individualized incentive strategies designed to increase effort and engagement from each participant (for "machine-aided human forecasting"). These aspects of embodiments of the present invention are designed to avoid some of the common pitfalls of machine forecasting, such as bias and drift, and to quickly adapt to new topics by harnessing information elicited from the crowd—the relevance of data sources for a given forecasting problem, opinions on machine forecasts, and possible correlations between events or topics—and using this information to automatically tune the machine forecasting models (for "human-aided machine forecasting"). The system identifies key attributes of high-performing forecasters and experts in individual topics, quantifying research behavior, long- and short-term forecasting accuracy, and the relationships between human and machine forecasters and the sources that they employ while making forecasts. Embodiments of the present invention may then leverage this information to modify human and machine forecaster behavior via intra- and cross-domain teaching to improve forecasting accuracy by providing baseline initializations for machine forecasting models and the display of topic-related data to humans—greatly reducing the amount of time required to train forecasting algorithms on a new topic area (for "human-machine symbiosis and mediation").

System Overview

Figure 1B:
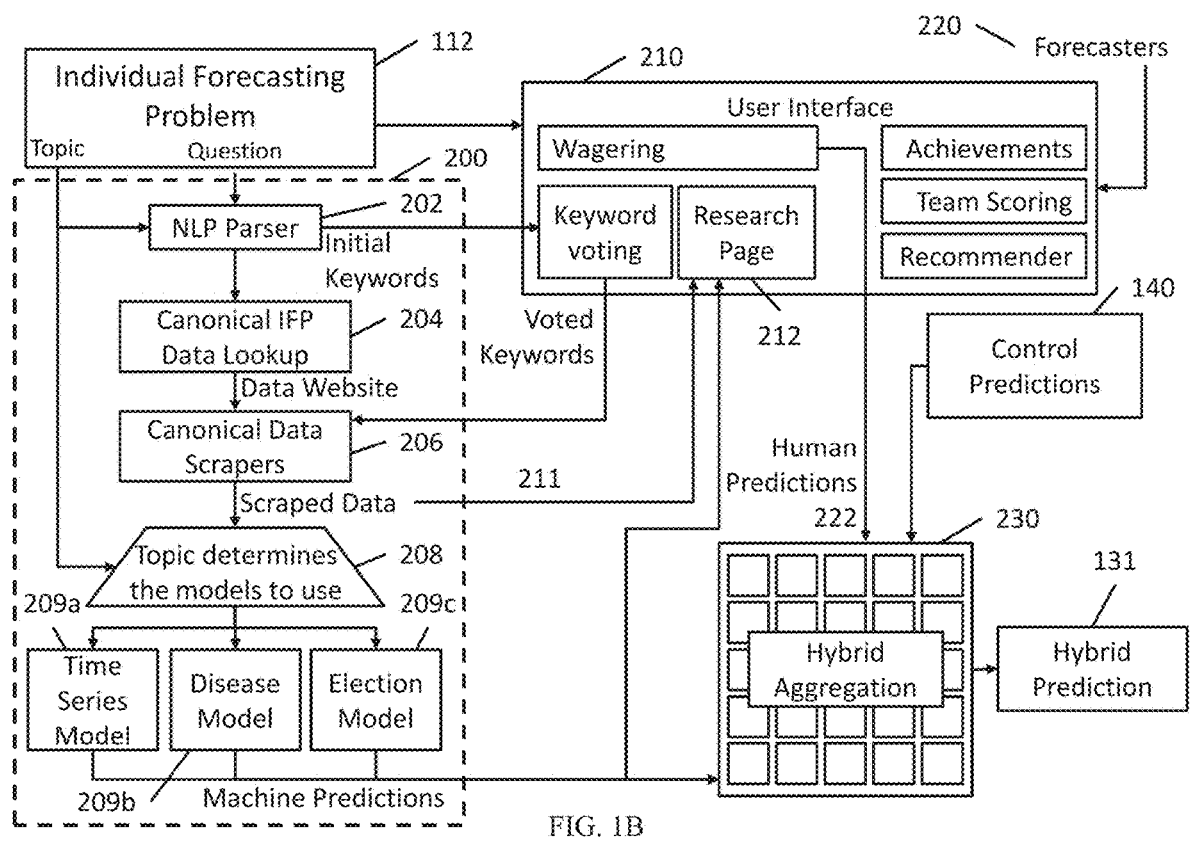
FIG. 1B is a schematic diagram depicting the flow of information through a hybrid forecasting system according to one embodiment of the present invention.

FIG. 1A is a system block diagram of a hybrid forecasting system 100 according to one embodiment of the present invention. FIG. 1B is a schematic diagram depicting the flow of information through a hybrid forecasting system 100 according to one embodiment of the present invention. Aspects of embodiments of the present invention will be described from three different angles, as shown in FIGS. 1A and 1B. One aspect, referred to as "machine-aided human forecasting" (MAHF) 110, is that machines can help humans to become better forecasters by reducing bias and mitigating fatigue. Another aspect, referred to as "human-aided machine forecasting" (HAMF) 120, is that human judgments may be leveraged to make machine forecasting algorithms and machine learning more efficient by identifying model drift and providing feedback to the machine models by viewing the outputs of the machine models, curating data supplied to the machine models, and the like. A third aspect, referred to as "human-machine symbiosis and mediation" (HMS) 130, is that the behaviors of the human forecasters and the machine forecasters can be combined in order to make better overall forecasts 131 and extract information from the human and machine forecasts to be used to improve the performance of the other modules ("teaching signals" in 114 and 124). Each of these strategies occupies a module in the system 100 that receives information from the other modules and from outside sources, processes it, and then passes relevant information to the other modules. This flow of information between modules allows the human participants and machines to improve each other through information and learning.

Referring to FIGS. 1A and 1B, an individual forecasting problem (IFP) 112 is presented to the system 100. The IFP 112 may take the form of a natural language question, such as "What will be the price of gold on Jul. 20, 2025?" presented as text (e.g., typed in using a computer keyboard or the text output of a speech-to-text engine). As shown in FIG. 1A, the current IFP 112 may be supplied to both the machine-aided human forecasting (MAHF) module 110 and the human-aided machine forecasting (HAMF) module 120. In more detail, as shown in FIG. 1B, a machine forecasting module 200 (which may be a component of the HAMF module 120) first parses the forecasting question text using a natural language parser (NLP Parser) 202, which extracts relevant variables and classifies the question as belonging to one of several canonical categories using the Canonical IFP Data Lookup module 204. Canonical Data Scrapers 206 scrape data from a variety of data sources 260 (e.g., sources on the internet, see FIG. 2) and store the data on the data cluster (e.g., persistent network storage devices) on a regular basis. In module 208, the canonical category and forecasting problem variables determine (based on the keywords and/or the scraped data) which machine forecasting method is triggered and retrieves the appropriate input data for that method. In some embodiments, a general time series model 209a may be used to make predictions for which there is time series data available. In some embodiments, there are specific models for predicting disease 209b, elections 209c, and civil unrest, as well as a generic time series prediction model that covers a more general range of forecasting questions where there is ample time-series data. For example, if the keywords include terms that are semantically related to the spread of disease (or other concepts, such as the spread of memes, that are well modeled by a disease model), then the disease model 209b may be selected. As another example, if the keywords include terms that relate to elections or voting, then the election model 209c may be selected. In the event that none of the specialized models is selected, then a standard time series model 209a may be selected.

The machine forecast or machine prediction 122 and input data are displayed on a user interface 210 (e.g., a user-facing website) as an information source (or curated data feeds 211) for the human forecasters 220 to make human forecasts (or human predictions) 222, and the machine forecast or machine prediction 122 is stored to be used in hybrid aggregation 230 by the human-machine symbiosis and mediation module 130.

Aspects of embodiments of the present invention relate to generating hybrid forecasts for each individual forecasting problem (IFP) using a collection of algorithms. The algorithms, as depicted in FIG. 1B, are broadly divided into the machine forecasting module 200, the user interface (e.g., a user-facing website) 210, and the hybrid aggregation module 230, each serving the forecasting system's tasks.

Some aspects of embodiments of the present invention relate to providing feedback to humans through a human teaching signal 114 provided by the Human-Machine Symbiosis and Mediation module 130. For example, if a participant answers a forecasting question incorrectly (as shown by the actual result later on), the feedback may include the rationales used by human participants who forecasted correctly. Some embodiments include a recommendation system that looks at the results of the forecasting and that routes questions to human forecasters based on their perceived ability to answer the forecasting question correctly. For example, if the HMS 130 detects that human forecaster A always answers economics questions correctly, then the recommendation system of the HMS 130 may route those economics questions to human forecaster A because doing so improves the chances of success (e.g., a correct answer). Conversely, if human forecaster B always gets economics questions wrong, but enjoys answering them, then the recommendation system of the HMS 130 may cause the user interface to stop showing those questions to human forecaster B, effectively barring them from answering economics questions and forcing human forecaster B to choose other questions that they might have better success at answering correctly. According to some embodiments, the user interface adapts to a user by making features that are correlated with accurate forecasting more conspicuous. For example, if the recommendation system of the HMS 130 detects that an accurate forecaster always uses a particular data source for answering particular types of questions, then the user interface may be automatically updated to make that particular data source more salient to other forecasters when answer such questions. In some embodiments, the HMS extracts feedback from human forecaster (e.g., mouse clicks, time spent on particular web pages, etc.) to detect the sources used and correlates the use of those sources with the forecasting accuracy of those human forecasters.

Likewise, some aspects of embodiments of the present invention relate to a machine teaching signal 124 provided by the Human-Machine Symbiosis and Mediation module 130. In some embodiments, the HMS 130 adjusts which questions are assigned to machine forecasters versus human forecasters based on forecaster performance. For example, the HMS 130 may detect that, for particular types of questions, a given machine forecasting algorithm is more consistently correct than the human forecasts without assistance, the system may adjust to use the machine forecast exclusively for these types of questions and to cease displaying those types of questions to the human participants. Some embodiments of the present invention also self-tune the machine algorithms—if the event outcome shows some predictable bias in the algorithms that can be traced to a parameter value, then the machine teaching signal might be a parameter adjustment that would make the machine forecast more in-line with the ground truth. In some embodiments, the adjustment is performed over the course of several questions, because constantly adjusting the parameters would likely cause problems of overfitting the data.

In addition, human meta-information 116 regarding the participants 220 may be provided to the HAMF module 120 and the HMS module 130. In some embodiments of the present invention, the human meta-information includes information provided to the HAMF module 120 and the HMS module 130 other than the forecasts. On the human forecaster side, in some embodiments this includes the tuning that the human forecaster 220 performs on the hybrid data display (which is why it is passed to HAMF module 120 in addition to the HMS module 130). In some embodiments, this human meta-information also includes behavioral data that is collected from the human forecasters 220, such as pages viewed, mouse clicks, and motion, which can be used to create correlations between forecasting accuracy and behavior for use in weighting forecasts or generate teaching signals.

In some embodiments of the present invention, past individual forecasting problem (IFP) ground truth data or control predictions 140 are provided to the HMS module 130. In some embodiments, the control predictions 140 are used to estimate or weight the credibility of human predictors and machine predictors, based on past performance on similar IFPs.

Figure 2:
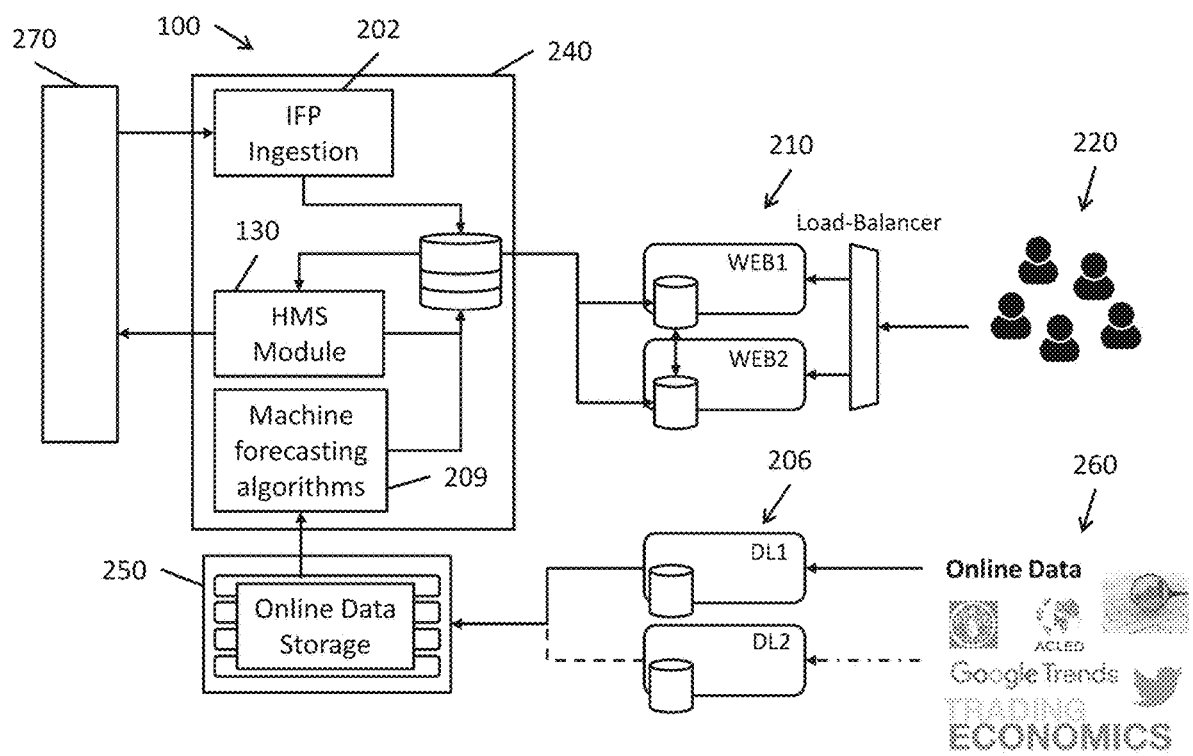
FIG. 2 is a schematic block diagram of a system for hybrid forecasting according to one embodiment of the present invention.

FIG. 2 is a schematic block diagram of a system 100 for hybrid forecasting according to one embodiment of the present invention. In the embodiment shown in FIG. 2, the system 100 includes three main computer systems, which are housed in a cloud computing environment, although embodiments of the present invention are not limited thereto and may include computer systems that are housed locally, or a combination of cloud and local computer systems. In one embodiment, web servers are used to provide the user interface 210, and a load balancer may be used to distribute requests between multiple web servers, where the requests may be received from human forecasters 220 (e.g., using web browsers on their local computing devices such as personal computers and smartphones). One or more computing systems 240 may perform tasks such as IFP ingestion/parsing, performing machine predictions, and computing hybrid predictions from human and machine inputs (human predictions and machine predictions); additional computing systems may provide data storage for retaining data scraped by the data scrapers 206 from data sources 260. The data sources 260 may include, for example, social media net-works such as Twitter®, Google® Trends data on search activity, economic indicators (e.g., from the website Trading Economics), data on current armed conflicts (e.g., from the Armed Conflict Location & Event Data Project (ACLED)), news sources (e.g., Google® News), etc. A user of the system may supply inputs (e.g., pose IFP questions) to the system via a testing and evaluation interface 270 and may also receive the generated human-machine hybrid predictions from the system 100 via the testing and evaluation interface 270.

Figure 3:
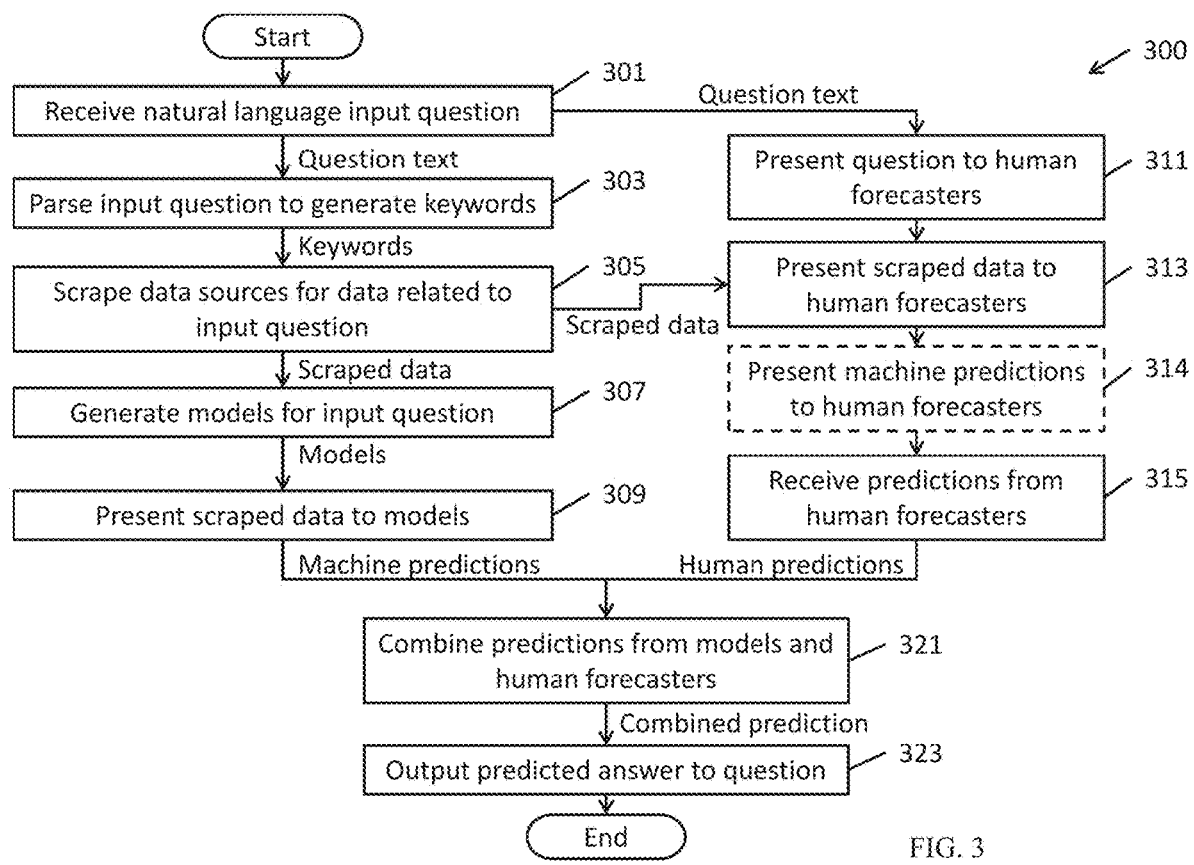
FIG. 3 is a flowchart of a method for generating predictions according to one embodiment of the present invention.

FIG. 3 is a flowchart of a method 300 for generating predictions according to one embodiment of the present invention. Referring to FIG. 3, in operation 301, the system (e.g., the NLP Parser 202) receives a natural language input question, and parses the input question to generate keywords in operation 303. In operation 305, the system (e.g., the canonical data scrapers 206) scrapes data sources 260 for data related to the input question (e.g., by searching for the keywords extracted from the input question). The keywords may also be used to generate or select models (e.g., models 209a, 209b, and 209c) in operation 307. In operation 309, the scraped data is presented to the models to generate machine (model) predictions (or "machine forecasts") of answers to the prediction question. In some embodiments of the present invention, the machine models also generate machine confidence scores representing the confidence of the machine model in the computer prediction.

Concurrently, the received question is presented to human forecasters through a user interface 210 (e.g., a user-facing website), and the data scraped in operation 305 is also presented to the human forecasters in operation 313. The human forecasters 220 may then make their own (human) predictions of the answer to the question, where their predictions may be informed by the scraped data. As described in more detail below, in some embodiments, the machine predictions computed by the models in operation 309 are also presented to the human forecasters 220 in operation 314, although embodiments of the present invention are not limited thereto and, in some embodiments, the machine predictions are not presented to the human forecasters 220. When presented with machine predictions, the human forecasters 220 may also use the machine predictions in making their human predictions. In operation 315, the system receives the human predictions through the user interface 310 and in operation 321 combines the machine predictions with the human predictions to generate a single combined prediction, which is output in operation 323 (e.g., presented to users through a report or an output user interface).

Machine-Aided Human Forecasting

Comparative experiments have shown that human crowds, as an aggregate, are generally excellent forecasters, likely leveraging their imaginations, quick learning, and varied backgrounds and perspectives to solve forecasting problems. However, crowds exhibit standard human weaknesses including: fatigue, bias, and long deliberation times (compared to a computer).

Machine-aided human forecasting (MAHF) leverages algorithms and machine learning to improve human forecasting performance through machine-assisted research, adaptive display of data, structured methods of discourse and argumentation, and various engagement strategies to keep participants focused on the task and returning for more, thereby counteracting some of the standard human tendencies. An MAHF module 110 according to one embodiment of the present invention is suitable for a wide range of topics as it is robust to situations without sufficient and relevant training data for generating fully automated machine models. In some embodiments, the MAHF module 110 also leverages forecasters' expertise and corrects potential biases. As shown in FIG. 1A, the MAHF module 110 takes inputs from other modules, including the Human-Aided Machine Forecasting (HAMF) module 120 and Human-Machine Symbiosis & Mediation (HMS) module 130, and elicits and integrates information from the human forecasters 220 of the system. The results from the MAHF module 110 are also forwarded to the other modules (e.g., the HAMF module 120 and the HMS module 130).

In some embodiments of the present invention, questions may take on one of three different formats: binary, ordinal, and multinomial, and this uniform user interface is used to handle any question that falls into these formats. A binary question asks the participant 220 to provide a response on a single variable, and is often phrased as a question with a "yes" or "no" response (e.g., "Will Pat Paulsen run for president in 2020?"). In this case, the system presents a single slider to the user, whose value represents the probability that the question will resolve to "yes."

An ordinal question asks the participant to provide a response on a single variable (e.g., "What will the price of gold be on Jan. 1, 2020?"), but does so through a series of "bins," which contain ranges of possible values for the variable (e.g., "0-500 USD," "501-1000 USD," "1001-1500 USD," "greater than 1501 USD"), where the participant is asked to assign a probability to each option (where the probabilities across all options sum to 1.0, in some embodiments, the user's responses are normalized to sum to 1.0). (The example shown in FIG. 4 is an ordinal question.)

A multinomial question elicits a response across multiple variables where there will be only one outcome, but many different and non-overlapping options are possible (e.g., "Who will win the next U.S. presidential election?"). Responses are elicited by providing a slider for each option and asking the participant to assign a probability to each outcome. In some embodiments, the sum of the probabilities across all options must sum to 1.0, and in some embodiments the raw input from the user (the slider positions) are normalized to sum to 1.0.

According to some embodiments of the present invention, for each forecasting question (IFP), participants or human forecasters 220 input their forecasts into the system through a user interface 210 (e.g., a website), which will be described in more detail below. In some embodiments, the questions are provided in a multiple-choice format and responses are elicited through one or more sliders, which ask the participant to assign a probability to each possible response. FIG. 4 is an example of a user interface, according to one embodiment of the present invention, for responding to a question "How much X will be produced by MM/DD/YYYY?" where four sliders are provided to indicate relative probabilities of each of four answers: "Less than 750"; "Between 750 and 900"; "More than 900 but less than 1050"; and "More than 1050." In some embodiments, the participant 220 is also asked to provide an optional rationale to explain the reasoning for their decision. This rationale may include references to time-series data or citations from literature or the internet. The rationales will be leveraged by other modules for discussion and aggregation purposes. In addition to eliciting forecasts and rationales, in some embodiments the system also requests a participant confidence score from the user (e.g., on a scale from zero to one), which may be used in the other system modules, such as when aggregating forecasts from different predictors (e.g., including human and machine predictors).

As discussed above, data related to the current forecasting question is scraped by the data scrapers 206 and may be presented to the participants 220 in operation 313. The data may be presented on a research page 212. The particular form of the data may vary based on the type of data that was scraped. For example, news articles may be presented as text and images or links to the articles on the source websites. In the particular case of time series data such as prices of goods over time, quantities of materials produced over time, frequency of keywords or hashtags appearing in social media over time, and search volume over time, the data may be presented in the form of line graphs or scatter plots.

In addition, the user interface 210 may show predictions made by machine models from the HAMF module 120 (e.g., predictions made by models 209*a*, 209*b*, and 209*c*) on the research page 212. As noted above and discussed in more detail below, the machine models generate the predictions based on data scraped from data sources 260.

Human forecasters or participants may choose to use the scraped data and the machine predictions as presented on the research page 212 (or as presented through other user interfaces) to assist in making their predictions (e.g., using a prediction interface such as that shown in FIG. 4).

Aspects of embodiments of the present invention relate to the display of data in a user interface that allows users to interact with the data in a "human in the loop" manner, as opposed to a "human on the loop," as would be the case with a passive display of information. Specifically, some aspects of embodiments of the present invention relate to user interfaces that provide: the ability to select a range of data for use by the computer models and to exclude noisy or anomalous data from the model; the ability to select a historical scale for incorporation into the model; and checkboxes for selecting which models are incorporated into the machine prediction for that forecasting problem and whose outputs are shown in the user interface. User interfaces according to embodiments of the present invention provide a communication path between the human operators and the underlying machine learning algorithms.

FIG. 5A depicts a user interface according to one embodiment of the present invention showing time series data of predictions of the price of a commodity over time and Google® Trends data showing relative interest in keywords over time. As shown in FIG. 5A, the time series of the price of the good includes the actual historical price of the commodity, the prior predictions by the user (labeled "You" in FIG. 5A), and the predictions made by the community of participants 220. In some embodiments, the time series also shows the current predictions of one or more selected models. In FIG. 5A only the "BSTS-Logistic" model is selected and, therefore, only one machine model prediction is shown. Various aspects of user interfaces in accordance with embodiments of the present invention allow a participant to interact with the data, including changing the time scale (e.g., to zoom in on particular days or weeks and to zoom out to view years or decades of data) and comparing different types of data (e.g., plotting multiple time series data on the same graph and on the same time scale).

Figure 5B:
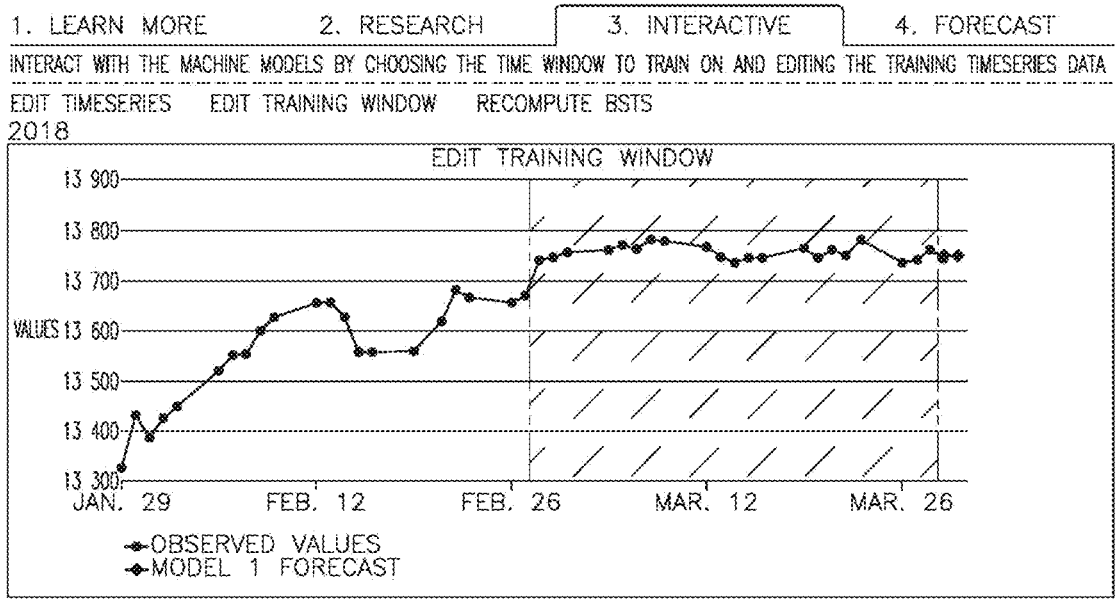
FIG. 5B depicts a user interface according to one embodiment of the present invention showing time series data of predictions of an exchange rate over time.

FIG. 5B depicts a user interface according to one embodiment of the present invention showing time series data of predictions of an exchange rate over time. In particular, FIG. 5B shows an example of a predicted daily exchange rate of the Indonesian Rupiah (IDR) to one U.S. Dollar on 30 Mar. 2018. The screenshot in FIG. 5B contrasts previously observed values (from Jan. 29, 2018 to Mar. 29, 2018) and the price forecasted by a model for the dates Mar. 28, 2018 and Mar. 29, 2018. A portion of the prior observed values is selected to constrain the data values that are supplied to the model for making its prediction.

In addition to allowing the human operators to examine and interact with the data that the machine provides, an analytics view, as shown in FIGS. 5A and 5B, of a research page 212 also provides an interface for participants to provide information to the human-aided machine forecasting module 120 to modulate and adjust the processing of the machine models 209 (e.g., machine learning models). This allows human participants 220 to apply their understanding of the data to improve the machine forecasts by pointing out problems with the machine forecasts.

By default, an algorithm will not discard any of the training data that is provided to it. However, outliers in the data (e.g., a hurricane causes a short, temporary spike in the price of gold) may cause a machine model to produce inaccurate results, especially when there is relatively little training data. On the other hand, a human predictor might be able to easily detect and assign meaning to such outliers in the data. The human predictor may then discount the outliers in the data when making their prediction. A machine model may produce more reliable results by ignoring the portion of the data corresponding to the outlier events. Accordingly, some aspects of embodiments of the present invention relate to providing human predictor feedback to a machine model to filter the input data to remove outliers.

Figure 5C:
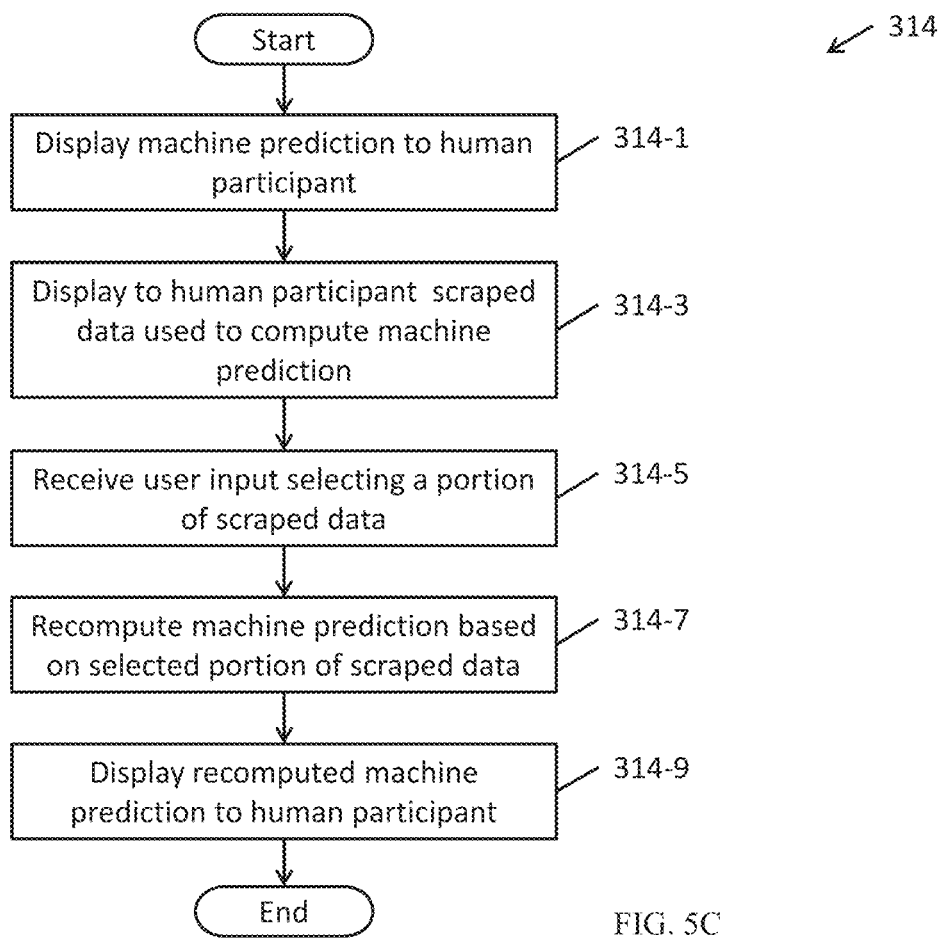
FIG. 5C is a flowchart of a method for recomputing a machine prediction based on a user selection of a portion of the scraped data supplied to a machine model according to one embodiment of the present invention.

FIG. 5C is a flowchart of a method for recomputing a machine prediction based on a user selection of a portion of the scraped data supplied to a machine model according to one embodiment of the present invention.

In one embodiment of the present invention, the user interface 210 includes an option for a participant 220 to flag any point on the time series and apply a comment to it that is visible to other users (and can be up- and down-voted by them). Referring to FIG. 5C, in operation 314-1, the user interface displays the machine prediction to a human participant. As shown in FIGS. 5A and 5B, in operation 314-3, the user interface also shows the scraped data (e.g., time series data) that was used by the machine model to compute the machine prediction that was displayed to the user in operation 314-1. In one embodiment of the present invention, the user interface allows a participant 220 to remove data points that may be outliers from the time series. In some embodiments, the user interface also allows a participant to select one or more windows of data points to be included. The selected data points (e.g., the ones that were not removed) are received in operation 314-5 and, in operation 314-7, the system 100 recomputes the predictions using the machine models to generate new machine-based forecasts in accordance with the selected data, where the recomputed machine predictions are displayed to the human participant, through the user interface, in operation 314-9.

For example, FIG. 5A shows that a shaded portion of the time series data is selected for use by the machine models. By clicking the "RE-MODEL" button shown in FIG. 5A, the predictions are recomputed by the machine models using only the selected data (and leaving out the unselected data). In some embodiments of the present invention, the predictions are automatically recomputed (e.g., in real-time or near-real time) whenever the participant 220 changes the selection of data to be supplied to the model. In some embodiments, the machine-aided human forecasting module searches for online data sources relevant to forecasting questions and displays the time series and a series of machine forecasts from different models (BSTS, ARMA, etc.) showing the training interval. In some embodiments, users may also submit keywords and see the time series of their search query history as reported by Google® Trends. As shown in FIG. 5A, the user may plot the frequency of searches for the keywords "sahara," "polisario," and "morocco" over time, along with predictions of the frequency of those search terms in the future.

One aspect of embodiments of the present invention relates to a user interface for the creation of customized predictive machine models through information that the participant supplies to the system. This information may include additional relevant time series data, which can then be processed by the machine forecasting system to generate a new forecast, or the inputting of keywords and phrases that can be cross-checked against social media for activity levels that may correlate with real-world events. Non-limiting examples of the type of online data sources that can be used in this step are Twitter, Google® Trends (an interface to the Google® search engine that provides time series-based analytics about the frequency of searches using specified search terms and can provide a general understanding about the popularity of a particular search at a given time), and various news sources and aggregators, such as ICEWS and Trading Economics, and combinations of these data sources.

The participant 220 may continue to perform this manipulation until the machine forecasting output appears reasonable. At this point, the participant 220 may choose to save the updated model (see machine teaching signal 124 of FIG. 1A). In some embodiments, updated models are added to an ensemble of models (discussed in more detail below) and may contribute to the final forecast computed in operation 321, where the weight of the user's modified model in the final output is determined by factors such as their historical accuracy and the historical accuracy of the models they produce.

For a forecasting problem with multiple different and potentially applicable machine models, it is a common strategy to provide some type of weighted aggregation between the machine models to produce a final aggregated prediction. However, the "cold start" problem is prevalent in this type of exercise, where, initially, there may be insufficient data to train accurate models automatically.

Human involvement in the aggregation process may help to alleviate the cold start problem. Embodiments of the present invention also enable the participants 220 to help the machine forecasting algorithms aggregate disparate methods. In some embodiments, the user interface 210 shows the outputs of the different machine forecasting models and what their weighted aggregate would predict. As shown in FIG. 5A, the participant 220 can interact with the prediction by checking or unchecking checkboxes to add or remove algorithms (forecasting models) from the aggregate, try different aggregator strategies, or tune the weights and other parameters. By integrating human intelligence and reinforcement learning from the results of forecasted IFPs, one can develop a system that can overcome the cold start problem by leveraging human prior knowledge, learn from the advice it receives from the crowd, and eventually become self-sufficient as the machine gains experience and acquires enough information (data) for training.

Event Detection and Alerts

After a human predictor or a machine predictor has made a prediction on a forecasting question, additional relevant events may occur. For example, a human predictor may answer a question to predict the value of a United States stock market index as of a particular date based on current interest rates and economic conditions. However, after the prediction has been made, the United States Federal Reserve may announce plans for long-term changes in interest rates, which may, in turn, affect the predicted value of the stock market index in the future. Accordingly, it would be beneficial for human predictors (and machine predictors) to update their predictions in response to relevant events.

Figure 5D:
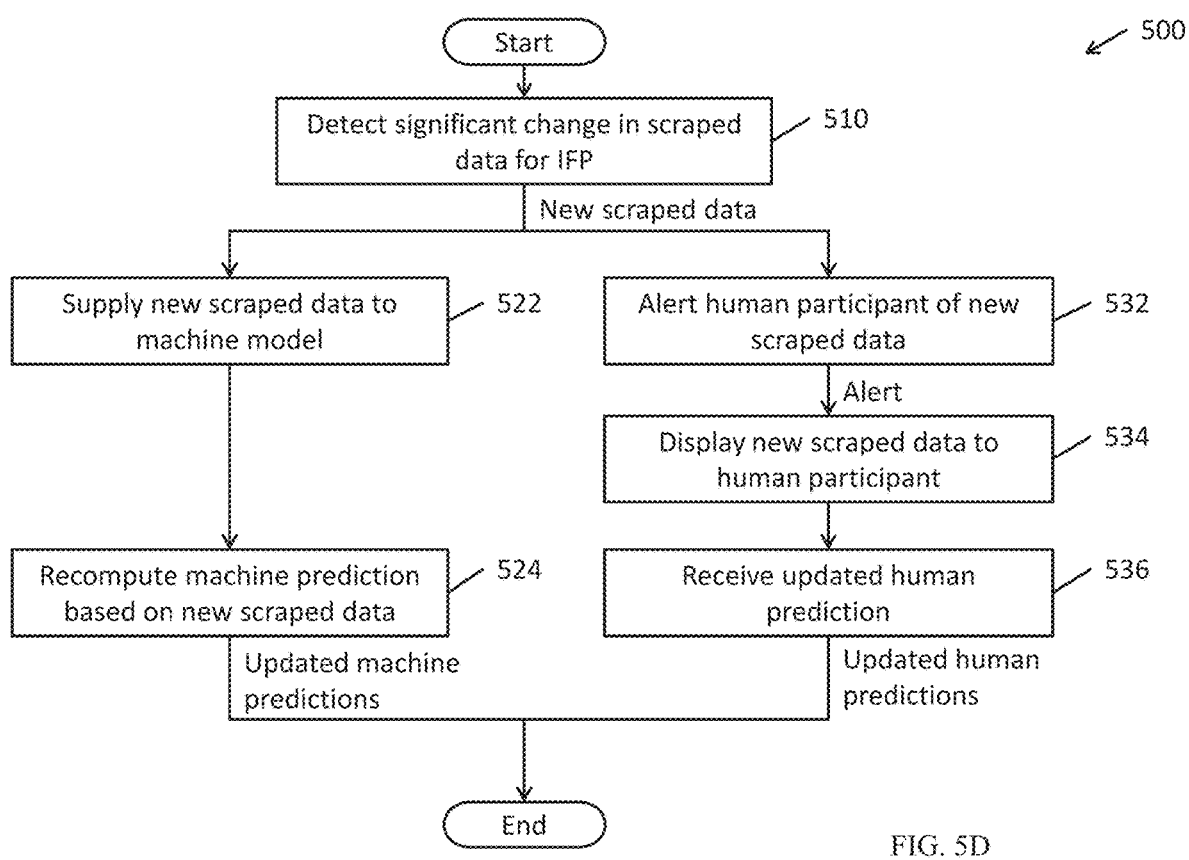
FIG. 5D is a flowchart depicting a method for updating predictions according to one embodiment of the present invention.

Accordingly, some aspects of embodiments of the present invention relate to driving the attention of participants 220 to updating previous forecasts without overloading the participants 220 with too many tasks. FIG. 5D is a flowchart depicting a method for updating predictions according to one embodiment of the present invention. In some embodiments of the present invention, a news service (such as Google® News, Google® Trends, Twitter®, ICEWS, Trading Economics, and/or LexisNexis®) is used to track the number of relevant news articles on a forecasting question over time (e.g., by searching the news service for articles relating to the keywords extracted from the forecasting question). Some embodiments of the present invention include an event detection system that periodically (e.g., hourly, daily, or weekly) performs searches for articles on one or more news services to count the number of news articles related to a forecasting question (e.g., news articles pertaining to the keywords extracted from the forecasting question) and detects, in operation 510, significant changes in the data associated with the keywords compared with previously scraped data. In some embodiments, the event detection system detects substantial increases (e.g., greater than two sigma or two standard deviations) in the number of news articles associated with the keywords. In some embodiments of the present invention, a data source 260 may provide time series data, and the event detection system detects significant changes in the values of the time series data (e.g., a change greater than two standard deviations from a value over one or more time windows). In some embodiments of the present invention, multiple types of data sources (e.g., news services and time series data sources) are used to generate alerts (e.g., significant changes in would result in the detection of an "event"). Some aspects of embodiments of the present invention further relate to applying an adaptive autoregressive integrated moving average (ARIMA) model to forecast two-sigma changes (e.g., in counts of news articles or in time series data) to give a day's prior warning.

In some embodiments of the present invention, detections of changes in the scraped data cause the system 100 to supply, in operation 522, the new scraped data to the one or more machine models 209 configured to make predictions on the corresponding IFP. The machine models 209 then compute updated machine predictions in operation 524 based on the new scraped data.

Likewise, in some embodiments of the present invention, the event detection system works in tandem with a communication system (e.g., email, instant messaging, push notifications, and the like) in operation 532 to alert participants 220 that a forecast that they previously made might be obsolete due to events that have occurred since the forecast was made, or that future events that may occur soon would render that forecast obsolete. The alert that is sent to the participants 220 may also include links or other user interface elements that allow the user to view the particular prediction question associated with the potentially obsolete forecast and to view the information displayed in operation 534 regarding the updated data (e.g., the more recent events pertaining to the prediction question). The human predictor may then update their predictions based on the new scraped data, and the user interface 210 of the system 100 may receive the updated human prediction in operation 536.

Structured Argumentation

One aspect of embodiments of the present invention relates to allowing human predictors 220 to collaborate and to critique each other's predictions, including the provided rationales and citations, for veracity and relevance. This allows the participants 220 in the prediction system to police one another for content, to direct discussions toward resolution (keeping on-topic), and to attempt to weed out various types of biases that can occur that might cause a forecast to be inaccurate. Systems and user interfaces for structured argumentation according to some aspects of embodiments of the present invention provide a solid opportunity for the underlying algorithms to improve the way that the human participants interact with the system.

In comparative crowdsourcing systems, such as those using "message board" or "message forum" based communication systems, interactions directed to policing or weeding out biases generally do not occur. The lack of such interactions may be due to attrition, smaller than expected teams on each forecasting problem, or teammates not wanting to interact with each other. As a result, many human forecasters were not kept "in check" by their peers, and posted citations that did not support their rationales or rationales that did not support their forecasts.

Therefore, some embodiments of the present invention relate to structures for providing and receiving feedback on forecasts and rationales that employ threaded commentary on each rationale, automatically displaying opposing rationales, and displaying where a participant's forecast falls on the spectrum of potential predictions. This feature may be referred to herein as "structured argumentation."

Figure 6A:
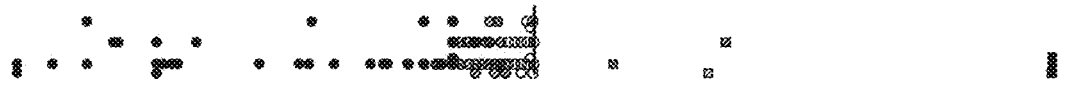
FIG. 6A is a screenshot of a portion of a user interface for structured argumentation according to one embodiment of the present invention.

FIG. 6A is a screenshot of a portion of a user interface for structured argumentation according to one embodiment of the present invention. According to some embodiments of the present invention, a user interface implementing structured argumentation provides a framework for discussion and debate for each forecasting problem (IFP), where feedback is encouraged by highlighting the feedback, and multiple points of view are prominently displayed for inspection and review by the participant human forecasters 220. According to one embodiment of the present invention, a structured argumentation interface dynamically updates based on a participant's forecast. When a participant 220 submits a forecast, the submitted forecast is shown on a graph relative to other, previously submitted forecasts (as shown in FIG. 6A, the position of the forecast along the horizontal axis represents the forecast value (or value of the forecast), and the position of the forecast along the vertical axis corresponds to the number of upvotes of the forecast by other human participants 220), which displays to the forecaster where they lie relative to their fellow human forecasters (e.g., teammates).

When submitting the forecast, the user interface shows a pair of columns under the forecast that show rationales for different participants' forecasts that are more extreme than the participant's forecast in either direction. For example, for a "pro" forecast, the participant would be shown some even more extreme "pro" forecasts as well as a range of "con" forecasts. In the given example, because the submitted forecast was "pro," there would likely be more "con" forecasts shown than "pro." Some aspects of embodiments of the present invention also incorporate peer rating/voting on individual rationales based on their veracity. Some aspects of embodiments of the present invention allow participants 220 to engage in threaded discussions under each rationale so that a participant's teammates can provide feedback on any given rationale. This structured argumentation user interface therefore continually presents every forecaster with opposing viewpoints, thereby encouraging interaction by presenting opposing viewpoints, which are more likely to be replied to than agreements, and threaded discussion that illustrates the direction of the debate.

Additional embodiments of structured argumentation are described in more detail in U.S. Provisional Patent Application No. 62/815,631, "System of Structured Argumentation for Asynchronous Collaboration and Machine-Based Arbitration," filed in the United States Patent and Trademark Office on Mar. 8, 2019, the entire disclosure of which is incorporated by reference herein.

Gamification

Despite the automation used in the prediction system, having an active and engaged pool of participants 220 is important for maintaining high overall system accuracy. Attrition or noncompliance of the participants 220 in the participant pool will result in degraded performance or failure of the hybrid prediction system to function. Accordingly, some aspects of embodiments of the present invention relate to systems and methods for reducing attrition and increasing engagement by participants 220 through gamification.

Examples of features that can be implemented in the system to improve engagement include challenges, badges, and leaderboards that are provided to the participants 220.

To encourage exploration of the system and personal achievement, some aspects of embodiments of the present invention relate to incorporating various challenges that are rewarded with badges that are displayed on a user's profile when they have been earned. In some embodiments of the present invention, the challenges are designed to be worked on individually without collaboration between participants. This makes them a strong motivator for participants who do not wish to compete with others or do not have strong confidence in their own forecasting abilities. Despite their name, challenges do not need to be difficult to complete, and a good set of challenges for a given forecasting task may include a balance between easier, participation-based tasks (e.g., use a particular feature 5 times), more difficult, "grinding" tasks (e.g., use a particular feature 1,000 times) and very challenging merit or skill based tasks (e.g., achieve an accuracy, as represented by a Brier score, of less than 0.2 on a question).

To encourage friendly competition among the participants of the system, in some embodiments of the present invention, the prediction system incorporates a leaderboard that allows participants to compare themselves to their peers along various elements of performance. FIG. 6B is an example of a system leaderboard according to one embodiment of the present invention. Teams of participants 220 are ranked according to one of multiple different metrics, and these rankings are displayed publicly on the leaderboard. While the most obvious ranking criterion is accuracy (e.g., Brier score), the leaderboard may also rank teams or individual participants on tasks completed, time spent using the system, number of challenges completed or number of badges earned. A toggle in the user interface allows users to switch between ranking methods.

Figure 6C:
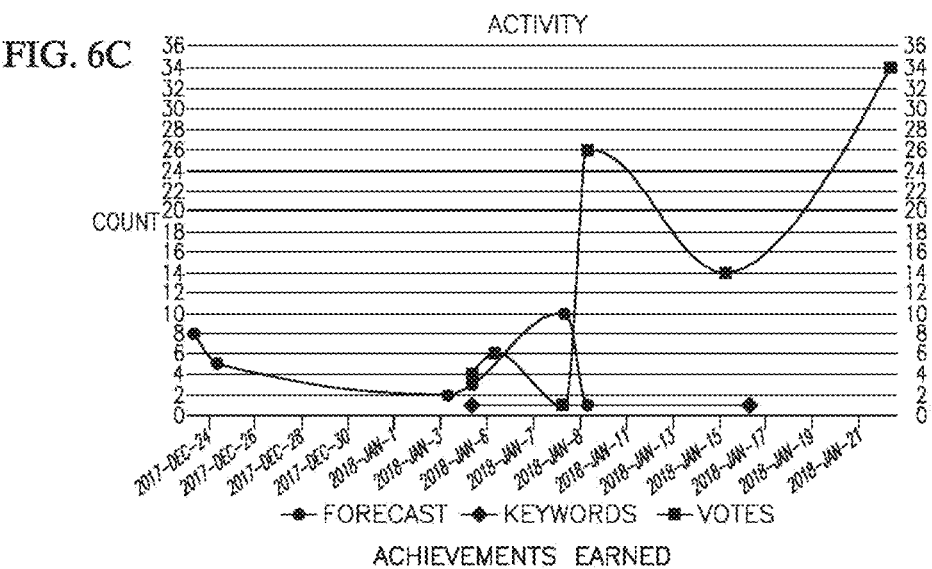
FIG. 6C is an example of a user interface according to one embodiment of the present invention showing the activity of a participant and achievements or badges earned by the participant.

FIG. 6C is an example of a user interface according to one embodiment of the present invention showing the activity of a participant and achievements or badges earned by the participant. As shown in FIG. 6C, in one embodiment, an activity graph shows the number of forecasts made by the participant, the number of keywords voted on by the participant, and the number of votes cast by the participant over the past few weeks. As also shown in FIG. 6C, the participant has earned a number of badges corresponding to different activities or challenges completed by the participant in the course of interacting with the prediction system.

Human-Aided Machine Forecasting

Machine-based algorithms have also shown an affinity for making forecasts, efficiently collecting and processing large volumes of data, and producing quantitative, precise responses to forecasting problems. However, algorithmic machine models have their own weaknesses: they generally require copious amounts of data to make accurate projections and often rely on assumptions about the data and the specific problem, making their generalizations to other problems difficult. Even when a person might consider two problems similar, a forecasting algorithm might require entirely different approaches. This collection of challenges is sometimes referred to as the "cold start" problem.

Accordingly, some aspects of embodiments of the present invention relate to a human-aided machine forecasting (HAMF) module 120 to provide a machine forecasting module that interfaces with crowd participants 220 and that employs human feedback at decision points in the machine forecasting pipeline to tune and update the machine models (e.g., tune the underlying algorithms), thereby improving the predictions made by the machine models and enabling robust and timely machine-generated forecasts.

As briefly described above in reference to FIG. 1B and FIG. 3, in operation 303 the system parses a received natural language input question (e.g., natural language text) to extract information such as the topic area and key terms and phrases that can be used to scrape information (in operation 305) to be used by the machine forecasting algorithms and displayed to the human participants.

According to one embodiment of the present invention, a forecasting question is automatically parsed and assigned to 1 of N "canonical categories" for which historical data is available. The forecasting question is also automatically parsed for key-phrases, entities, and values using a custom parser in conjunction with named entity-extraction functionality of a natural language processing library (such as SpaCy from ExplosionAI GmbH). Systems and methods for parsing questions are described in more detail in U.S. Provisional Patent Application No. 62/804,016, filed in the United States Patent and Trademark Office on Feb. 11, 2019, the entire disclosure of which is incorporated by reference herein. This set of key-phrases may be further expanded with key-phrases or keywords provided by the participants 220 of the system, such as using the keyword voting module of the user interface 210, as described in more detail below. In operation 305, the system uses canonical data scrapers 206 to collect available time series or trend data for the key-phrases from various data sources, as described above (e.g., Google® News and Twitter®). The historical data associated with the "canonical categories" is then accessed from a database which stores previously scraped open source values (e.g., stored in online data storage 250). The historical data is used as the value of interest, and the key-phrase trend data is used as the input into the machine models. In some embodiments, this is represented using a context vector, which is extracted from the question text, and the historical time-series data is chunked into smaller windows in order to increase the size of the training set. The strategy is conditional on contextual awareness, and as such can be used to identify globally optimal key-phrases that are broadly related to semantic contexts rather than specific quantities of interest. Consequently, the parsing module 202 is able to extract broad data about the forecasting question that may be further refined by the human participants 220 in the system through interaction with the machine learning and hybrid analytics display module of the user interface 210, as described in more detail below.

Generalized Time Series-Based Machine Learning

Some aspects of embodiments of the present invention relate to machine forecasting systems that are applicable to a general set of machine forecasting problems, assuming that ample data is available to run the forecasting model.

To provide forecasts on the widest range of topics, some embodiments of the present invention leverage Bayesian Structural Time Series (BSTS) models (see, e.g., Scott, S. L., & Varian, H. R. (2014). "Predicting the present with Bayesian structural time series." *International Journal of Mathematical Modelling and Numerical Optimisation*, 5(1-2), 4-23.), but embodiments of the present invention are not limited thereto and may also incorporate time-series analysis tools such as ARIMA, autoregression (AR), etc., as an ensemble (e.g., combinations of analytical tools) whose final forecast is the result of some combination of methods. BSTS models are very flexible due to their modular nature, and standard time-series models such as various autoregressive processes (AR, ARIMA, etc.) can also be implemented as simplified BSTS sub-models. Accordingly, embodiments of the present invention fit a time-series regression model on historical data such that the value of a series of interest (e.g., a Food and Agriculture Organization (FAO) of the United Nations price index) is predicted in the very near-term by several other indicators (e.g., Google® Trends keyword series, Twitter® keyword count series, online news article counts involving keywords, economic indicator time-series, etc.). Beyond the use of predictor time series for regression, some aspects of the present invention also provide options for capturing seasonality, holidays, and non-Gaussian error models. In some embodiments of the present invention, Gaussian error models are used for all models except binary IFPs, which use logistic regression instead.

Time series models 209a, such as the BSTS model or ARIMA, may be used on any forecasting question for which time series data exists. The amount of data affects both the accuracy of the time series model and the confidence bound.

An initial analysis of two hundred forecasting questions (provided by an independent source) revealed twenty different forecasting topics contained in online data sources that could be scraped and downloaded and then could be used in a machine-based analysis. From the text of a given forecasting question, the language parser 202 was applied to determine the general topic area. For data-rich forecasting problems, the question text generally followed predictable patterns, which made the topic identification for the machine-parseable IFPs relatively painless. The topics for these IFPs fell into areas such as commodity prices (e.g., gold or oil) on a particular date, short or long-term interest rates on a particular date, or occurrences of a disease in an area for a given month, and the data for these were readily available from internet sources.

On the other hand, for less standardized questions that are not readily analyzed by the language parser 202 (e.g., where keyword extraction fails to identify salient keywords), some aspects of embodiments of the present invention are directed to obtaining assistance from human participants to determine a given forecasting topic. For example, when parsing the text of an IFP, an alternate spelling (or misspelling) of a country name or an alternative wording of an IFP may cause the natural language parser 202 to fail, leaving the system without information such as the general topic area of an IFP.

Accordingly, one embodiment of the present invention uses "flash cards" to obtain this assistance by eliciting "micro information" from participants 220 to fill gaps in the system. In one embodiment, the flash card system includes a flash card minigame in which the user interface 210 displays "flash cards" to the participant that elicit small amounts of information that a user can understand and answer in a few seconds. The information that this minigame collects can vary depending on the particular issues faced by the system. Some examples of questions include: "which of these forecasting questions would you most like to answer?" and "what topic does this forecasting question belong to?" FIG. 6D is a screenshot of a user interface according to one embodiment of the present invention, displaying a flashcard asking the user to classify the forecasting question "Will the Government of Canada issue a travel advisory of 'Avoid all travel' for Nicaragua between 29 Jun. 2018 and 31 Aug. 2018?" with five potential topics: "Politics/International Relations"; "Natural Science/Climate"; "Macroeconomics/ Finance"; "Elections"; and "Health/Disease."

In some embodiments of the present invention, the flash card minigame has multiple levels, where each level contains questions that involve a particular length of time to answer or have a similar level of complexity. For example, the aforementioned questions might correspond to "level one" of the game, and subsequent levels might include questions of increased difficulty (e.g., "is this argument for or against a given IFP position?") or time to answer (e.g., "does this citation [link provided] support the provided argument?").

Flash card minigames in accordance with embodiments of the present invention can be used to improve the performance of the prediction system as a whole. For example, feedback from participants 220 can improve the categorization or triage of forecasting questions in instances when the text parser is not able to categorize a question. Participant feedback can also elicit information about which forecasting questions a user might be interested in answering in the future and can provide external feedback on the structured argument for the question (from people who are not assigned the question and are objective observers of the discussion). Breaking problems into smaller tasks that are disembodied from the main forecasting task will also allow the participants 220 to contribute to the system without committing to the entire research/forecast process and will also enable the system to elicit information from participants that are not assigned to the relevant IFP, thereby expanding the participant base on a temporary basis when specific extra information would be helpful to the system. Also, in some embodiments, the inclusion of a "quick forecast" flash card that elicits a gut instinct from a forecaster and compares those forecasts to the more deliberated forecasts from the main system provides some additional input for various forecasting questions.

Some aspects of embodiments of the present invention relate to combining generalized time series models (to forecast events) with specialized forecasting models for specific topic domains, such as the spread of disease 209b, the outcome of elections 209c, and the onset of domestic unrest and violence (not shown). For example, forecasting problems that revolve around the spread of disease, such as influenza, may be able to leverage disease models 209b such as FluNet (see, e.g., World Health Organization. (2011). FluNet. *Global Influenza Surveillance and Response System (GISRS)*.) and/or the Global Epidemic and Mobility model (GLEAM) (see, e.g., Balcan, D., Gonçalves, B., Hu, H., Ramasco, J. J., Colizza, V., & Vespignani, A. (2010). "Modeling the spatial spread of infectious diseases: The GLobal Epidemic and Mobility computational model." *Journal of computational science*, 1(3), 132-145. and Van den Broeck, W., Gioannini, C., Gonçalves, B., Quaggiotto, M., Colizza, V., & Vespignani, A. (2011). The GLEaMviz computational tool, a publicly available software to explore realistic epidemic spreading scenarios at the global scale. *BMC infectious diseases*, 11(1), 37.). Likewise, various embodiments of the present invention may use one or more election forecasting models 209c that leverage polling and social media data. These additional models are added as inputs to the machine learning ensemble and are averaged into the final output of the system via the adaptive aggregation modules, which will be discussed in a later section.

Some aspects of embodiments of the present invention relate to systems and methods for crowdsourcing keywords and phrases that are likely indicators of various geopolitical events and using the resulting keywords and phrases to direct machine models (e.g., forecasting algorithms) to scour internet news sources to automate these forecasts. This allows embodiments of the present invention to work across a wider range of different forecasting topics by providing easily-extracted search terms to the machine forecasting system without the need to include a variety of subject matter experts (SMEs) across different topical specialties and with less reliance on social media, instead using news and search results.

Accordingly, some aspects of embodiments of the present invention relate to a keyword voting and suggestion mechanism. In some embodiments of the present invention, a keyword voting and suggestion interface is placed on the forecasting web page as a separate tab in the user interface. FIG. 6E depicts an example of a user interface for keyword suggestion and voting according to one embodiment of the present invention. As shown in FIG. 6E, a user is presented with a current forecasting question (IFP) of "Will Syria's President Bashar Al-Assad experience a significant leadership disruption before 1 Sep. 2018?" The user interface depicted in FIG. 6E also includes eight keywords or keyphrases, each of which has voting buttons to vote up or vote down the corresponding keyword, as well as a count of the net total number of votes for the keyword or key-phrase (e.g., where a downvote cancels out an upvote). The particular example shown in FIG. 6E includes the keywords "leadership," "assad," "syria," "disruption," "significant leadership disruption," "president," "bashar," and "bashar al-assad."

According to one aspect of embodiments of the present invention, at the onset of a new forecasting question (IFP), the natural language processing parser 202 of the system parses the text of the IFP and proposes a list of possible keywords and phrases ("initial keywords") that may be useful search terms. Participants are invited to vote on those initial keywords and add their own using the "keyword voting" module of the user interface 210. Keywords and phrases with votes (e.g., net upvotes and downvotes) that exceed a threshold are used by the machine forecasting algorithms to improve their forecasts (the "voted keywords"). For example, in some embodiments, the keywords and phrases that have sufficient votes from the participants 220 are supplied to the models 209 for further use. In some embodiments of the present invention, the importance of the keywords is weighted based on the net number of votes.

In some embodiments of the present invention, the data scrapers 206 perform the scraping of the data relevant to the IFP from various data sources (e.g., as discussed above, Google® Trends and various news information such as ICEWS) in accordance with the votes from participants 220 on the keywords (e.g., as filtered by thresholds or as weighted by net numbers of votes). The time series data from the analytics of these keywords and phrases are then passed to the generalized time-series machine learning module 209a and/or other specific models such as a disease model 209b, an election model 209c, and a civil unrest model, where they can be correlated to past events and leveraged to make more accurate automated forecasts.

Human-Machine Hybrid Forecasting

While the MAHF module 110 and HAMF module 120 provide systems that allow machines to make humans more efficient forecasters and vice-versa, the human-machine symbiosis (HMS) module 130 provides systems and methods that allow each of humans and machines to influence the behavior of the other and to combine their separate predictions to make hybrid forecasts. In more detail, some aspects of embodiments of the present invention relate to capturing the decision-making behaviors of exceptional human and machine forecasters (e.g., based on a history of high accuracy in their predictions) and using this information to encourage different behaviors among forecasters. For example, data recommendation or teaming between forecasters can improve the aggregated performance of the group of forecasters. Some aspects of embodiments of the present invention relate to fusing the forecasts from human and machine sources into a single hybrid forecast for each forecasting question.

Dynamic Teaming and Task Assignment

Some aspects of embodiments of the present invention relate to improving communication and teamwork amongst participants 220 through dynamic teaming. In some comparative systems, long-term issues arose due to participant attrition and uneven interest across all forecasting topics. For example, in these comparative systems, a plurality of participants said that their teammates were not active at all (50% of survey respondents), that they did not work with their teammates (34% of respondents), and that being on a team generally was not very useful (28% of respondents). Even without attrition, not every participant would make informed forecasts on every question, and as a result, many questions may be sparsely forecasted upon, as observed during initial experiments in a comparative system.

In some embodiments of the present invention, the human-machine symbiosis module 130 adjusts to these challenges by creating the teams independently for each forecasting question at the time when the question is made available to the participants 220 through the user interface 210, thereby allowing the system to adapt on-the-fly to participant attrition and lightly-covered IFPs to increase the likelihood that all IFPs are adequately staffed by the participants who are most likely to engage with the IFP and to answer accurately. In some embodiments of the present invention, at the onset of each forecasting question, the human-machine symbiosis module 130 selects individual participants to answer the question, based on a match between the topic of the question and the participants' expressed interests, and the participants' prior performance on problems in the topic area. Participants may also generally be selected based on intake survey results and the demand for forecasters on the given question, which will vary based on the difficulty of the question and the ability of the automated forecasting modules (e.g., the machine models) to provide forecasting assistance.

Figure 7A:
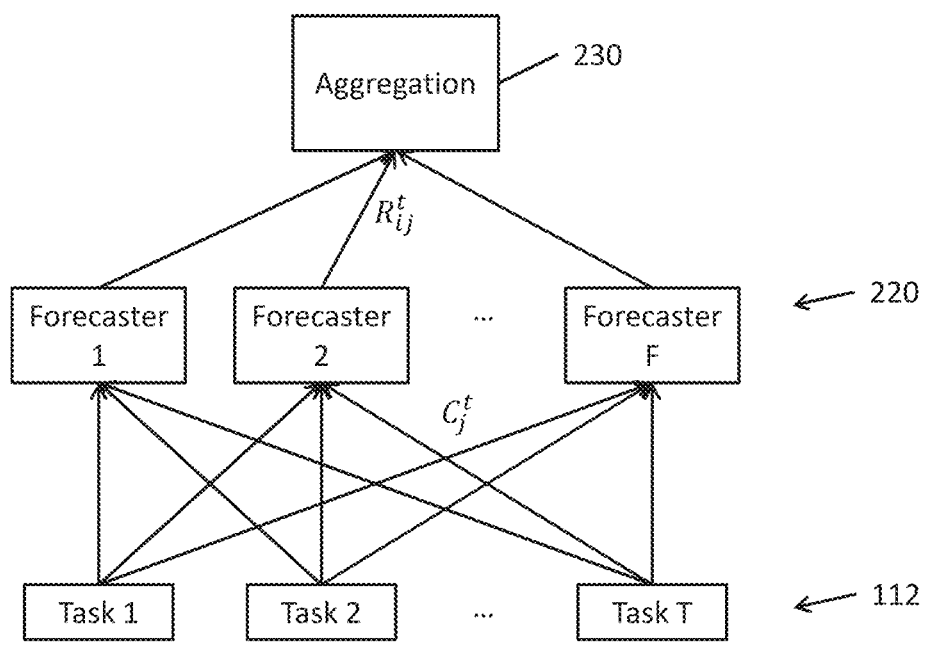
FIG. 7A is a block diagram illustrating an example of dynamic team assignment using a method according to one embodiment of the present invention.

FIG. 7A is a block diagram illustrating an example of dynamic team assignment using a method according to one embodiment of the present invention. In the embodiment shown in FIG. 7A, T different tasks or IFPs 112 (numbered from 1 to T) are assigned to F different human forecasters or participants 220 (numbered from 1 to F). The forecasters may be assigned to one or more tasks in accordance with the predicted likelihoods $C_j^t$ that the i-th forecasters will answer the j-th task (or question) accurately and their individual forecasts $R_{ij}^t$ are forwarded to an aggregation module 230 of the human-machine symbiosis module 130, as discussed in more detail below with respect to FIG. 7B. In some aspects of embodiments of the present invention, the aggregation module 230 aggregates the individual forecasts by weighting the forecasts based on the expected accuracy of each forecaster, as discussed in more detail below with respect to FIG. 7C.

Figure 7B:
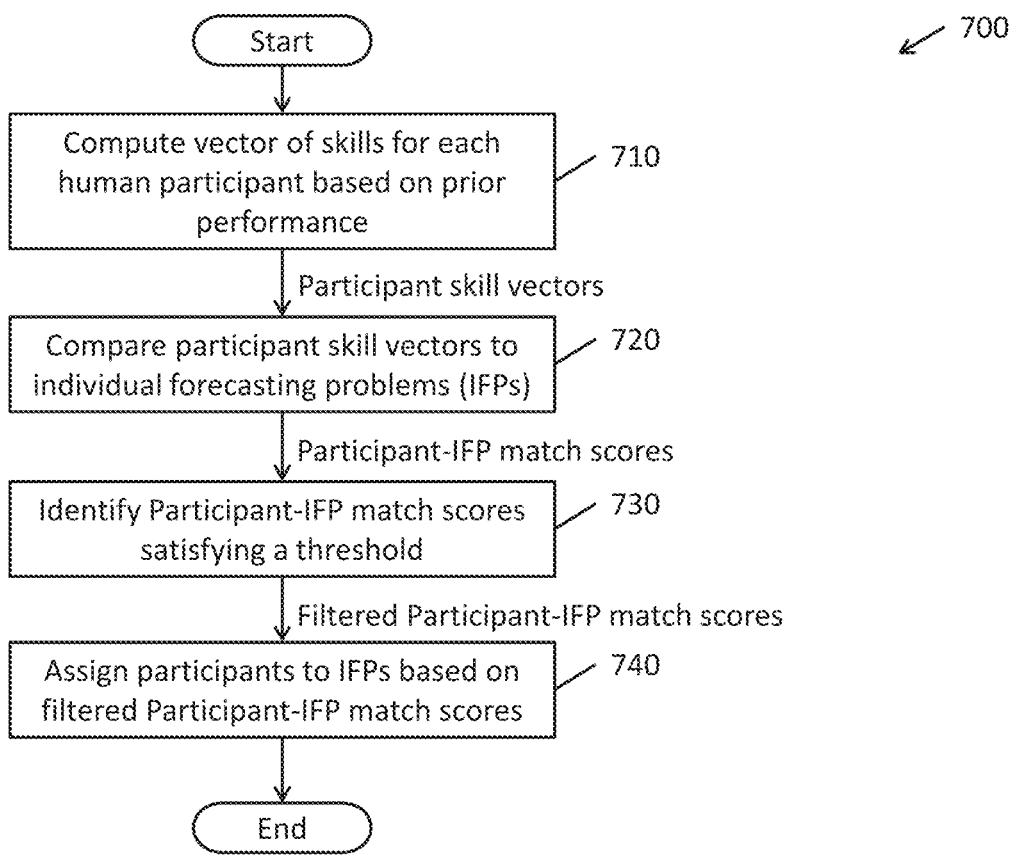
FIG. 7B is a flowchart of a method for dynamically assigning participants to individual forecasting problems (IFPs) according to one embodiment of the present invention.

FIG. 7B is a flowchart of a method for dynamically assigning participants to individual forecasting problems (IFPs) according to one embodiment of the present invention. In some embodiments of the present invention, a multitask learning technique is used to determine the skill sets of the participants 220 in a sparse-data scenario and how they relate to the requirements of a given task (e.g., each individual forecasting question). In some embodiments of the present invention, the performance of a participant is modeled as a vector (participant skill vector) representing how his or her skills match the skills required to answer the questions of a given task. In operation 710, the human-machine symbiosis module 130 computes a participant skill vector for each human participant 220, where the participant skill vector represents the skills and/or knowledge of a particular participant, as inferred based on, for example, past performance of the participant.

In more detail, in one embodiment, the task-specific skills of a participant for a particular task are represented as a combination of basic skills, such as math or knowledge in politics, which are represented by the columns of a dictionary. For each task, there exists some set of skills, such as knowledge of probability or political insight, that are required to successfully forecast its IFPs. Accordingly, a human-machine symbiosis module 130 associates the forecasters or participants 220 with the proper skill set with the appropriate tasks. In some embodiments of the present invention, a biconvex optimization is applied to learn the parameters and to solve the optimization problem given the performance history of the participants 220 (e.g., whether the predictions made by the participants 220 ultimately were shown, in the case of binary questions, to be correct and, in the case of ordinal and multinomial questions, the size of the error in the predictions), where solving the optimization problem may include comparing the participant skill vectors of each participant with the skills required by (or associated with) the currently available individual forecasting problems in operation 720 to compute Participant-IFP match scores, and identifying Participant-IFP match scores satisfying a threshold (e.g., reflecting a minimum compatibility between the participant and the IFP).

In some embodiments of the present invention, each participant is modeled as parameters in a multitask learning framework, where the participant skill vector corresponds to the parameters. These parameters for a particular participant include the skill set of the participant, the ability of the participant to answer questions correctly, and the likelihood that the participant will answer an IFP correctly (e.g., Participant-IFP match score). In some embodiments of the present invention, these parameters are computed through a combination of simulation and empirical data collection. In some embodiments, the human-machine symbiosis module 130 employs Markov Chain Monte Carlo (MCMC) to compute the participant skill vector (or abilities) of a participant based on the performance history of that participant on observed data. In some embodiments, the human-machine symbiosis module then formulates a biconvex optimization problem using these estimated parameters to infer the future performance (e.g., Participant-IFP match score) of the participant on IFPs within the topic area and their potential skills in other topic areas. In some embodiments, the matches are computed through alternation on variables, where the values are updated iteratively using convex optimization strategies until some convergence criterion is met.

Accordingly, in some embodiments of the present invention, in operation 740, the human-machine symbiosis module 130 assigns new forecasting questions to those participants who are skilled enough to answer those questions, where the skill of the participant is modeled by the model parameters described above. In some embodiments of the present invention, the method 700 is re-run periodically to update the participant skill vectors and the assignments of the forecaster population (the participants 220) across forecasting problems and to attempt to keep all problems adequately populated. For example, in one embodiment of the present invention, if the response rate on an individual forecasting problem is too low (e.g., few participants responded during a prior period), then additional participants may be assigned in operation 740 for the following period.

In some embodiments of the present invention, when IFPs are assigned to human forecasters or participants 220 in operation 740, each individual participant is provided some number of questions during a time period (e.g., one week), tailored to their preferences and expertise, and will be asked to answer as many questions as they like. In some aspects of embodiments of the present invention, the human-machine symbiosis module adjusts to unanswered questions and assigns them to other participants 220 at a later time when re-running the method 700. However, embodiments of the present invention may still provide participants with choices by assigning more forecasting problems than the participant will be able to answer, and if a participant ignores an assigned forecasting problem for a designated length of time, it may be removed from the assignment and replaced with another. This strategy allows embodiments of the present invention to adjust the number of human participants for a given forecasting problem around factors such as its popularity or the difficulty for a machine to answer. This allows the human effort to be focused and optimizes the time that the forecasters spend researching and making forecasts.

In some embodiments of the present invention, an additional component of assignment of participants in operation 740 is that the dynamic teaming approach provides the ability to adjust how many human participants are assigned to answer each forecasting question. In instances where there is ample time-series data and machine models have been shown to be very accurate, it may be possible to reduce or eliminate human input on a forecasting question (e.g., in cases where human input would not improve the predictions made by the hybrid prediction system). In some embodiments, this is determined experimentally (e.g., when historical evidence shows that the machine alone is more accurate than the human-machine hybrid forecasts). In some embodiments, the multitask learning framework determines when the machine possesses enough "skill" to answer the forecasting question without additional input from human participants (e.g., when the machine models achieve a threshold level of accuracy).

Some examples of systems and methods for assigning participants to tasks are described in more detail in Rostami, M., Huber, D., & Lu, T. C. (2018, September). A crowdsourcing triage algorithm for geopolitical event forecasting. In *Proceedings of the 12th ACM Conference on Recommender Systems* (pp. 377-381). ACM. and in U.S. patent application Ser. No. 16/522,529, filed in the United States Patent and Trademark Office on Jul. 25, 2019, the entire disclosure of which is incorporated by reference herein.

As discussed above, in some embodiments of the present invention, the human-machine symbiosis and mediation module 130 includes a hybrid aggregation module 230 configured to compute, in operation 321, hybrid forecasts 131 from an aggregate of all of the inputs from the other modules (e.g., the machine-aided human forecasting module 110 and the human-aided machine forecasting module 120) that create the ensemble (e.g., human, machine, human-machine forecasts) into a single output forecast 131 for each forecasting question. In some embodiments of the present invention, the aggregation is performed using a series of adaptive algorithms that monitor the progress and historical performance of the various elements of the ensemble (e.g., the performance of various human predictors 220 and machine models 209) and weights the predictions according to their historical accuracy.

Figure 7C:
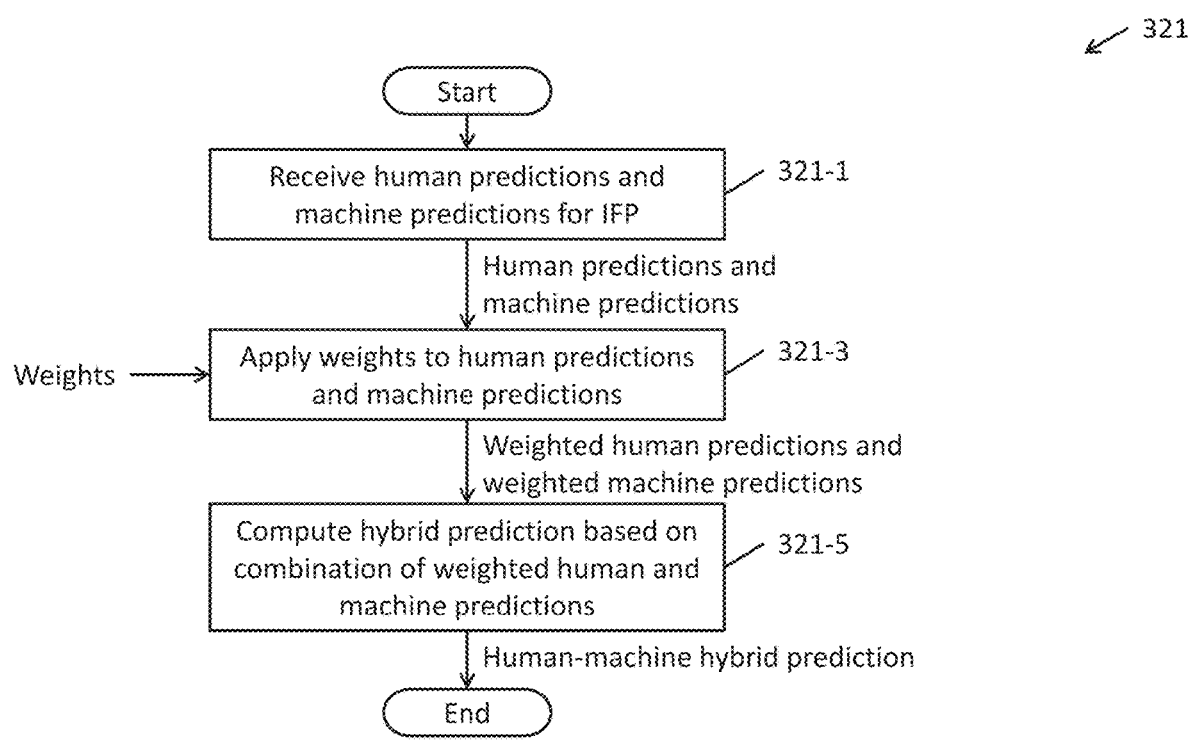
FIG. 7C is a flowchart of a method for aggregating forecasts from participants to compute hybrid predictions to the individual forecasting problems (IFPs) according to one embodiment of the present invention.

FIG. 7C is a flowchart of a method for aggregating forecasts from participants to compute hybrid predictions to the individual forecasting problems (IFPs) according to one embodiment of the present invention. The method shown in FIG. 7C corresponds to some embodiments of the computation of a hybrid forecast in operation 321 shown in FIG. 3. As shown in FIG. 7C, in operation 321-1, for a given IFP, the hybrid aggregation module 230 of the HMS module 130 receives or retrieves human forecasts from human predictions 220 (e.g., received via the user interface 210) and machine forecasts from the machine models 209. In operation 321-3, the hybrid aggregation module 230 weights the human forecasts and the machine forecasts in accordance with weights computed based on the past performance of the human participants 220 and the machine models 209. In operation 321-5, the hybrid aggregation module 230 computes a hybrid forecast (e.g., a single human-machine hybrid forecast) based on the current human forecasts and current machine forecasts.

As a non-limiting example, in some embodiments of the present invention, the Multiplicative Weights algorithm may be employed to perform the aggregation of operation 321 (see, e.g., Arora, S., Hazan, E., & Kale, S. (2012). The Multiplicative Weights Update Method: a Meta-Algorithm and Applications. *Theory of Computing*, 8(1), 121-164). The Multiplicative Weights algorithm uses the historical performance of the various elements in the ensemble (e.g., the various human participants 220 and the machine models 209 that are generating predictions for the current IFP) to compute the weights associated with each human forecast and each machine forecast when making the final hybrid prediction of the IFP.

As another non-limiting example, in some embodiments of the present invention, an artificial neural network (ANN) is employed to provide an aggregated output forecast among the various input forecasts from the machine models 209 and the human participants 220. In more detail, predictions made by the machine models 209 and the human participants 220 on prior IFPs may be used as the input vectors of the training data, where the correct labels for these training data may be the actual outcomes of those IFPs (e.g., the actual price of the commodity on the forecast date or the actual outcome of an election). Accordingly, a neural network (e.g., a single layer neural network) may be trained based on the input predictions and output labels on a wide range of IFPs. In some embodiments of the present invention, the predictions made by human participants are aggregated or grouped (e.g., based on skill sets or based on having similar participant skill vectors) in order to account for changes in the individual participants answering the various IFPs. During the training process, a set of weights of the connections between the input neurons (e.g., corresponding to the features) and other portions of the neural network (e.g., an output layer in the case of a single layer neural network, and an intermediate layer of the neural network in the case of a deep neural network) may be computed (e.g., using gradient descent to minimize a cost function representing a distance between the target labels of the data set and the output of the ANN). A resulting set of weights maps the contributions of the predictions made by each source of predictions: the human participants 220 (in some embodiments, grouped predictions from participants) and the separate machine models 209.

In still other embodiments of the present invention, algorithms that weight the elements of the ensemble based on their confidence or some elements of gamification (e.g., wagering, see, e.g., Chen, Y., & Wang, J. (2018). Randomized Wagering Mechanisms. *arXiv preprint arXiv: 1809.04136.*) or filter the ensemble by the top n-tile (e.g., quartile, percentile) and use only those inputs are used to generate an output forecast. In particular, the weights shown in FIG. 7C may correspond to the participant confidence scores reported by the human participants or the machine confidence scores reported by the machine models 209, which, in some embodiments, is further adjusted based on the prior performance of the human participants and the machine models (e.g., by weighting the confidence of the human-machine symbiosis module 130 in the machine confidences and human confidences self-reported by the machine models 209 and the participants 220).

User Interface

As briefly discussed above, in some embodiments of the present invention, the user interface 210 for the system is a website for the human participants 220 to view forecasting questions and submit their forecasts. However, embodiments of the present invention are not limited thereto, and the user interface 210 may be implemented using various other techniques such as a standalone application running on a desktop computer, laptop computer, or mobile device.

In some embodiments of the present invention, the user interface 210 allows participants 220 to choose any question from a list of available or assigned forecasting questions that is displayed on one of the web pages. For each forecasting question, the user interface 210 provides functionalities for participants to submit a forecast (e.g., using an interface such as that described in reference to FIG. 4), view the machine forecast and view and edit time series data used by the machine forecast (e.g., using an interface such as that described in reference to FIGS. 5A and 5B), submit keywords to assist the machine data scraping and vote on other user-submitted keywords (e.g., using an interface such as that described in reference to FIG. 6E), and place wagers to win wagering points. To promote engagement and reduce anchoring bias, users are divided into teams, and leaderboards are available at both the team level and individual level to track progress (see, e.g., FIG. 6B).

FIG. 8 is a depiction of a participant dashboard of a user interface according to one embodiment of the present invention. As shown in FIG. 8, the dashboard depicts the status of two forecasting questions to which the participant (e.g., the participant logged in to the system using the user interface 210) recently submitted forecasts. The dashboard may also include a depiction of the range of responses submitted by all forecasters for each of the questions, and whether the forecasters have generally reached a consensus on an answer to each of the questions. The main user landing pages are the user dashboard and user profile page, illustrated in detail in FIG. 8 and FIG. 6C. The user dashboard provides a navigation hub to users. From here, a participant can look at their recent forecasts (and make updates), examine forecast problems that have been recommended to them through methods such as collaborative filtering, and examine the resolution pages of forecasting problems that have resolved to see how they scored relative to others.

Figure 9:
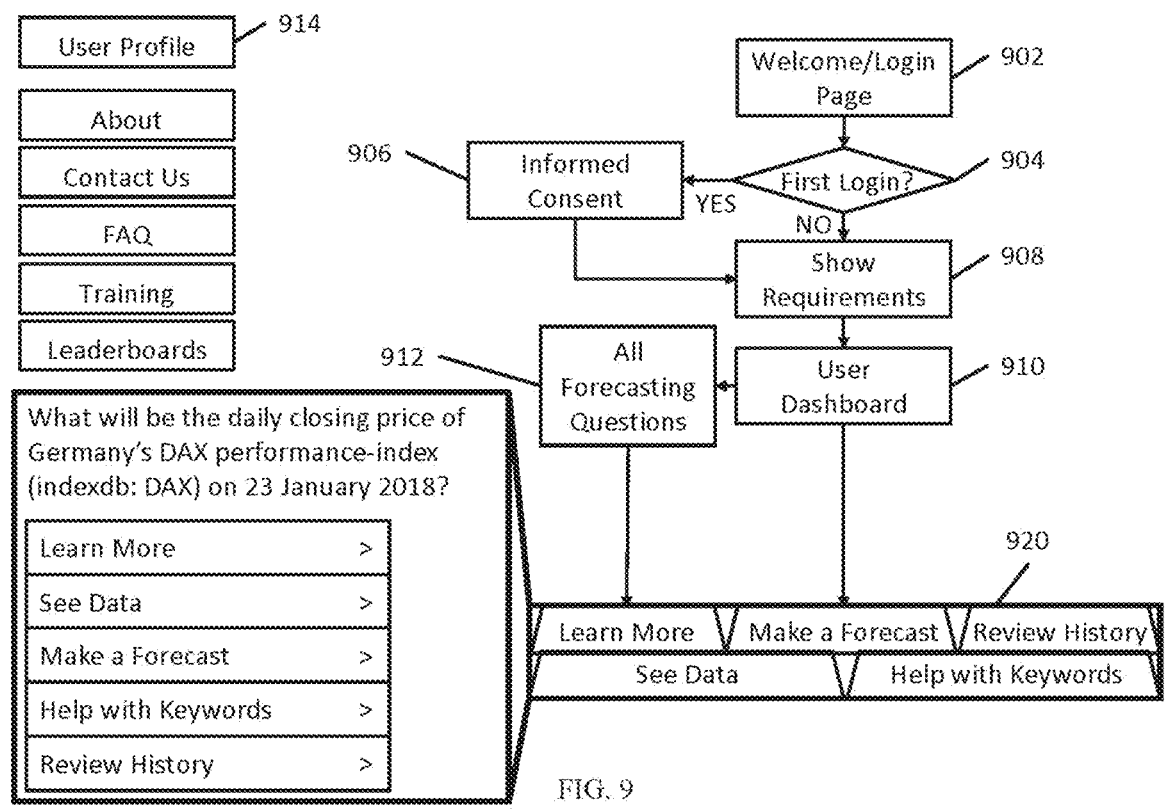
FIG. 9 is a schematic illustration of a map for a user interface according to one embodiment of the present invention, along with depictions of portions of the user interface.

FIG. 9 is a schematic illustration of a map for a user interface according to one embodiment of the present invention, along with depictions of portions of the user interface. As shown in FIG. 9, at 902, participants 220 register a username and password and/or other login credentials for the system using the registered username and password. Participants 220 pass through the welcome page, and, if it is their first time on the website, as determined at 904, they are presented with an informed consent document at 906 (as required). In either case, at 908, the participants 220 are shown a list of requirements to complete the forecasting task. After completing the informed consent at 906 and being shown the requirements at 908, a participant is directed to the user dashboard at 910 (as shown, for example, in FIG. 8), which provides forecasting question recommendations based on the user's past performance, selections, and algorithmic assignment, links to closed IFPs and their resolutions, and a link to the "user profile" 914, which reports on the gamification elements of the system, such as activity level plots, achievements earned, and wagering points won (see, e.g., FIG. 6C). When the participant is ready to begin making forecasts, they can click on one of the available forecasting questions, or can optionally choose from the complete list of available forecasting questions by selecting the "All Forecasting Questions" menu link at 912.

The "Make a Forecast" page 920 is where a participant is expected to spend the bulk of their time on the user interface 210. In some embodiments, various forecasting sub-tasks are separated into tabs on an accordion layout in the user interface 210, and may be arranged for vertical scrolling on mobile devices (e.g., tablets and smartphones). In some embodiments, the text of the forecasting question is prominently displayed at the top of the page and is always in view. In some embodiments of the present invention, a "Learn More" tab provides participants 220 with additional information about the question and links to relevant data sources, if they are available (e.g., links to data scraped by the data scrapers 206). The user interface 210 also supplies a "See Data" tab which, in some embodiments, displays the time series for relevant data sources (e.g., history of gold or oil prices) and, in some embodiments, displays the Google® Trends data for highly-voted keywords and phrases (see, e.g., FIG. 5A). In some embodiments, the "Make a Forecast" tab provides a series of sliders for making the actual forecast and a free-text field for adding a rationale or citing sources (see, e.g., FIG. 4), which other participants can use in their own research or create debates around. The "Help with Keywords" tab facilitates the keyword and phrase voting mechanism that was described above with respect to FIG. 9.

In some embodiments of the present invention, the "Review History" tab displays the forecasts of everyone else on a team, accompanied by their rationales. Participants are invited to read and critique the other forecasters' rationales by voting and providing comments on them with the objective of refining a team's median forecast (and ultimately improving it) through discussion and exchange of information and ideas. This may be implemented as a message board, and may also include structured argumentation as discussed above.

Administrative Interface

Some aspects of embodiments of the present invention relate to systems, methods, and user interfaces for monitoring the activities (e.g., database entries, individual user behaviors, etc.) of a hybrid prediction system according to embodiments of the present invention during live operation. In some embodiments of the present invention, an administrative dashboard is implemented in the system backend to provide an administrator interface for system operators and administrators to view the activity and behavior of the participants. In some embodiments, the administrative dashboard or administrator interface is implemented in a web-based environment (e.g., with a web browser based interface). In some embodiments of the present invention, the administrative dashboard is only visible to authorized users (e.g., administrators of the hybrid prediction system).

Figure 10A:
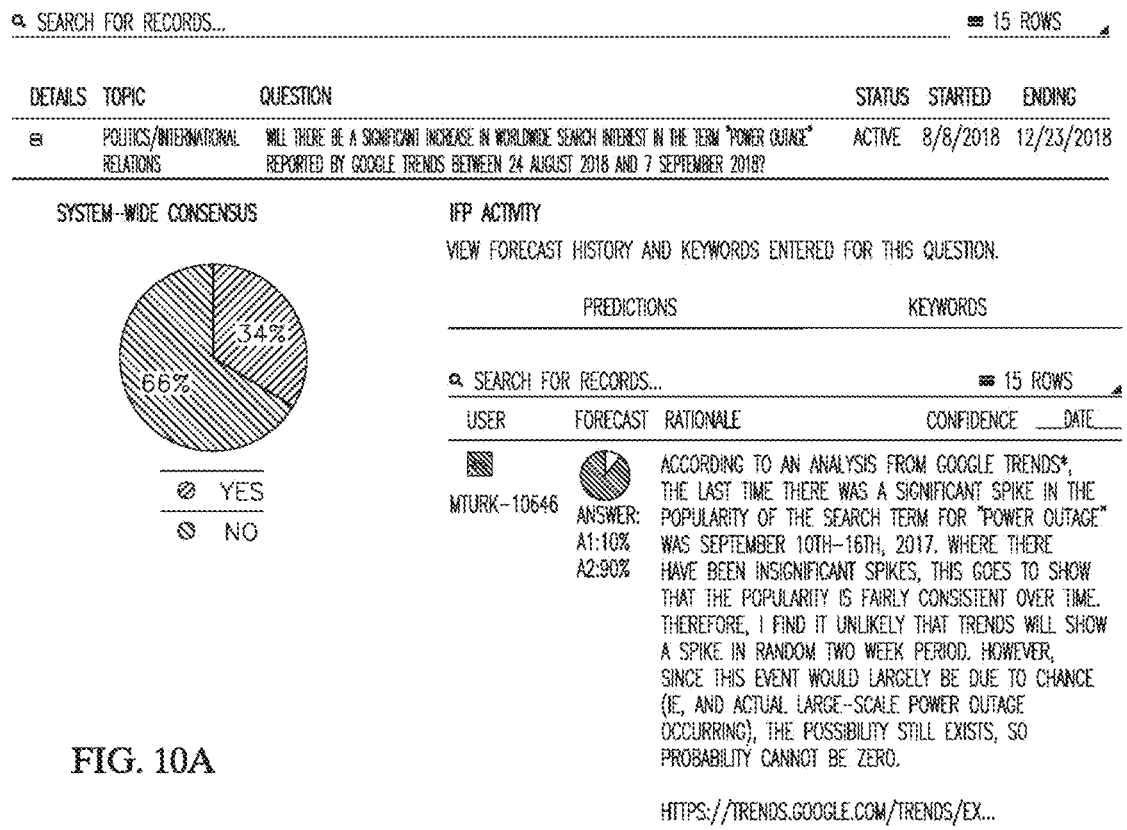
FIG. 10A is a screenshot of an administrative dashboard according to one embodiment of the present invention in a forecast question-centric viewpoint.

FIG. 10A is a screenshot of an administrative dashboard according to one embodiment of the present invention in a forecast question-centric viewpoint. In this mode, the administrative dashboard displays information about individual forecasting questions, including showing which participants 220 have provided forecasts on each forecasting question, the historical accuracy of the participants 220 on the forecasting question, the activity levels of those participants 220, and the rationales supplied by those participants 220. In some embodiments, the administrative dashboard displays which teams are engaged in active discussions about each forecasting question or topic area. In some embodiments, the administrative dashboard also shows the activity across teams for the question, the consensus forecast, and the various rationales that have been supplied by the participants for that forecasting problem.

Figure 10B:
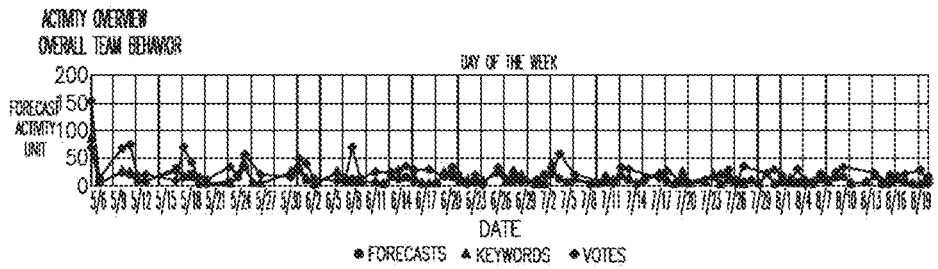
FIG. 10B depicts a portion of the administrative dashboard according to one embodiment of the present invention that is dedicated to monitoring the activity of teams and individual participants.

In some embodiments, the administrative dashboard allows administrators to drill down into the individual users on each team, looking at the users' activity levels, rationales, behaviors, and team interactions through forum posts and rationale commentary. FIG. 10B depicts a portion of the administrative dashboard according to one embodiment of the present invention that is dedicated to monitoring the activity of teams and individual participants. At the top of the dashboard shown in FIG. 10B is the activity of each team in the system with a time series display of each team's activity (e.g., forecasts, keywords supplied, keyword or rationale votes, etc.). For a given team, the administrator interface allows an administrator to "drill down," by displaying the information for each individual participant of the team, including the activity levels, accuracy, productivity, etc., of each individual participant. From this view, it is also possible to drill down into each participant, showing the individual forecasting questions that the participants have answered, their forecasts and rationales, and their votes and communication with other participants 220 on their team.

In some embodiments of the present invention, the administrator interface enables switching back and forth between the forecasting problem-centric and forecaster-centric modes by performing drill-down operations into the forecasts for an individual forecaster and the forecasters for an individual forecasting problem. This allows the system administrator to look at the audit trail and various components that go into the final system forecast for each question and is very useful for debugging and research purposes.

In some embodiments of the present invention, the administrative dashboard provides information on the behavior of the aggregator algorithms on each forecasting question, showing how individual participant forecasts are weighted in the hybrid decision, the algorithmic sources of those weights, and how the aggregator algorithms generate hybrid forecasts at a low level.

In some embodiments of the present invention, the administrative dashboard provides comparisons of statistics and information for different groups of participants 220.

Accordingly, embodiments of the present invention relate to systems and methods for generating human-machine hybrid forecasts in response to forecasting questions, where human forecasts are aggregated with machine forecasts, and the aggregated forecasts are used to generate single, hybrid predictions. Some aspects of embodiments of the present invention relate to assisting human predictors with data from machine models, and additional aspects of embodiments of the present invention relate to providing machine models with feedback from human predictors.

In one embodiment of the present invention, a randomized control trial (RCT) of the system in one embodiment was performed over the course of six months, during which 187 Individual Forecasting Problems (IFPs) were released on a weekly basis. In the randomized control trial, the response to each IFP was either a single probability in the case of a binary question or multiple choice for ordinal or multinomial questions, where each choice is assigned a probability or likelihood. The forecasting system automatically parsed the IFP text to determine its topic area and presented these IFPs to the human forecasters and machine algorithms, where the system elicited responses from each group. Hybrid forecasts were generated and evaluated during the RCT period. After the time period associated with the IFP elapsed, the actual outcome of the IFP was determined. The Brier score (a measure of error) for the system was computed for each IFP and for each day that the IFP was active, and the average Brier score over its lifetime was computed as the "average daily Brier" score for that IFP. The score for the system for the RCT was computed as the average daily Brier score for each of the 187 IFPs, with each IFP given equal weight.

Figure 11:
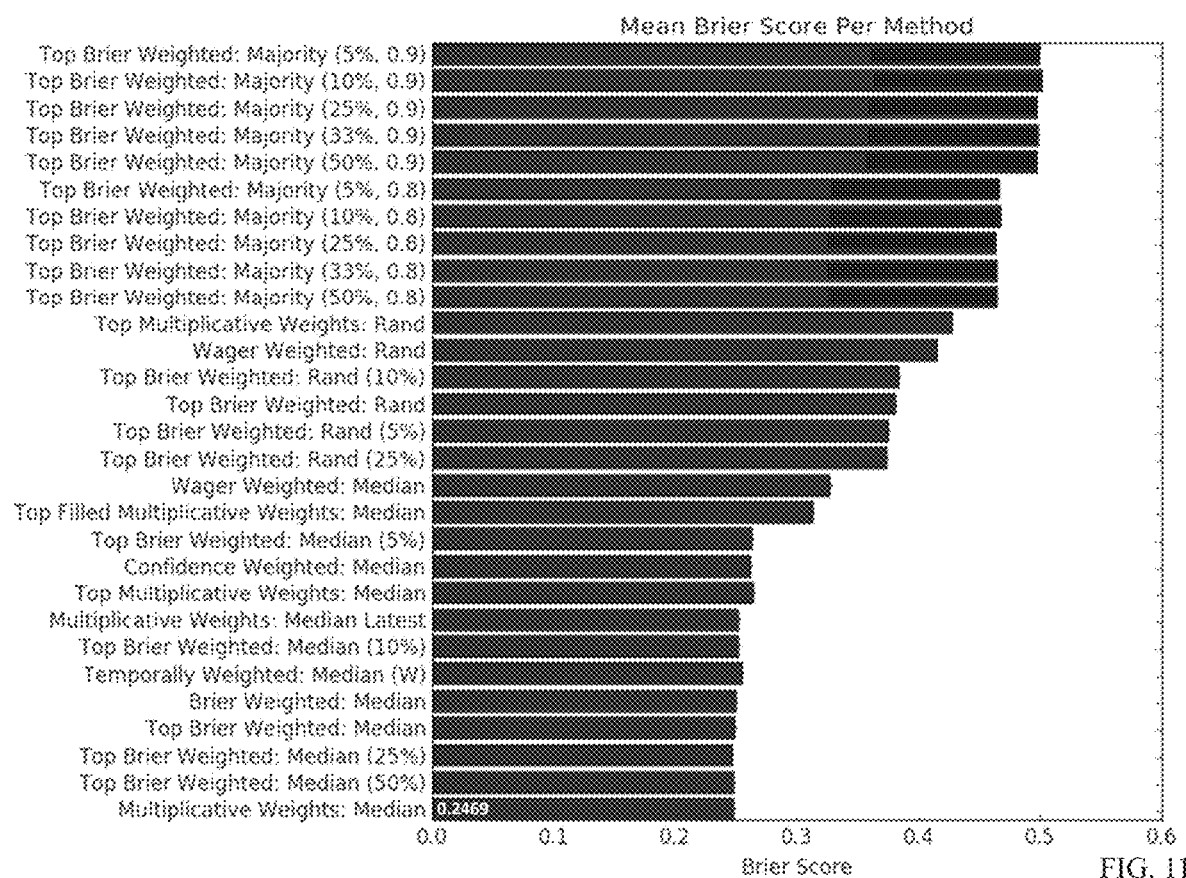
FIG. 11 presents results of a randomized control trial of a system according to one embodiment of the present invention, for various methods of forecast aggregation.

FIG. 11 presents results of a randomized control trial of a system according to one embodiment of the present invention, for various methods of forecast aggregation. A lower Brier score indicates a higher forecast accuracy. As shown in FIG. 11, the nine best methods (shown at the bottom of FIG. 11) all provide substantially equivalently-accurate results, with Brier scores of around 0.27 to 0.28. All of the algorithms shown in the embodiments of FIG. 11 are adaptive methods that learn from the historical performance of the participants and algorithms and adjusts their weight in the ensemble accordingly. The "Brier-weighted" algorithms assign weights to each forecaster (human and machine) that are proportional to the Brier weight of that forecaster over all prior resolved forecasting questions in the RCT. The "multiplicative weights" algorithms employ a method that computes a series of weights for forecasters based on the historical accuracy using a more complex algorithm than the Brier-weighted method (see, e.g., Arora, S., Hazan, E., and Kale, S. (2012). The Multiplicative Weights Update Method: a Meta-Algorithm and Applications. *Theory of Computing*, 8(1), 121-164). The algorithms of the embodiments shown in FIG. 11 generally involve taking the top N % of the population and then computing a result from the probability density function (pdf) of the population of weighted scores. For example, in the top-brier weighted: Median (50%), the top half of the population is selected according to their historical Brier scores on prior questions, and assigned weights according to their Brier scores (such as 2-Brier or 1/Brier), and then the median of the distribution provided by those scores is returned as the aggregated forecast. For confidence weighted: median, the scores are weighted by the confidence that the participant assigned to the answer, the weighted scores are used to build a pdf, and the median of that pdf is returned as the aggregated forecast. All of the algorithms listed in FIG. 11 follow similar patterns: find a subdivision of a population, build a pdf of their forecasts based on some weight, and then return one of the measures of central tendency for the resulting pdf. "Rand" means that the population for the pdf was randomly chosen without regard for historical performance.

Accordingly, embodiments of the present invention provide systems and methods for combining human forecasts with machine forecasts in response to individual forecasting problems, thereby improving forecasts overall.

Computer Systems

Figure 12:
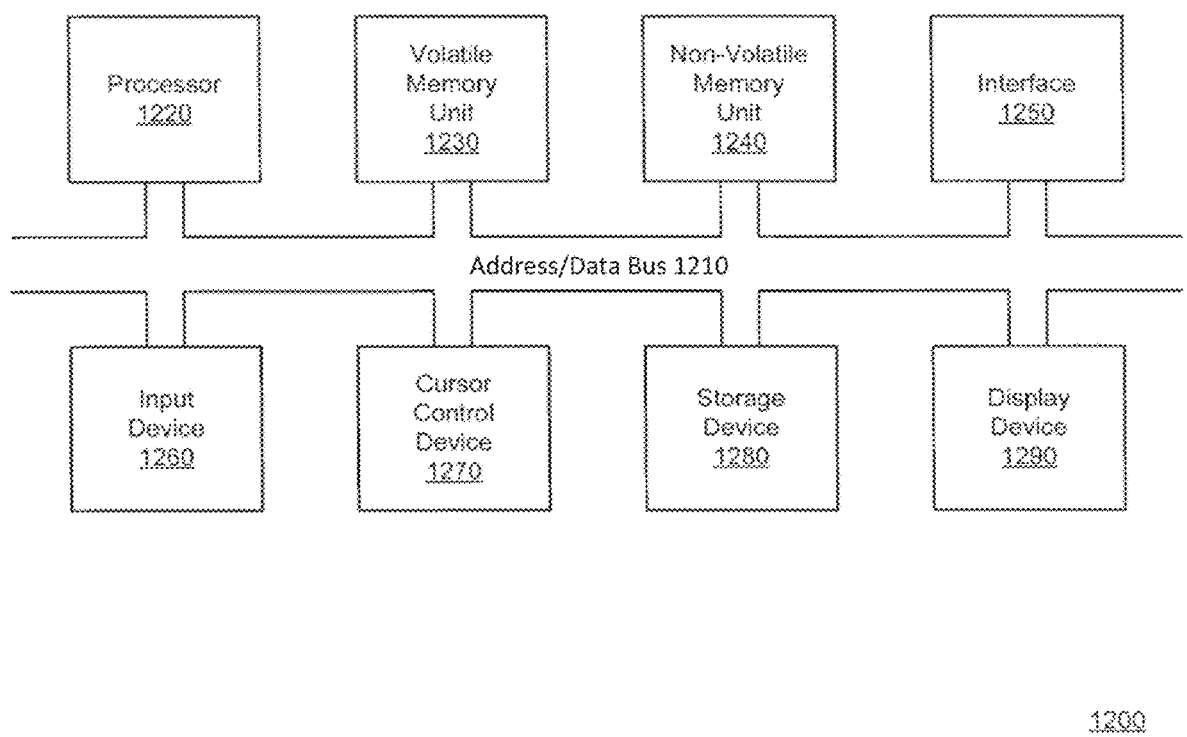
FIG. 12 is a block diagram of a computer system that may be used in conjunction with embodiments of the present invention.

An exemplary computer system 1200 in accordance with an embodiment is shown in FIG. 12. Computer systems similar to those described herein may be used, for example, to implement the model training system described above, and/or trained models in pre-deployment and in deployment, but embodiments of the present invention are not limited thereto. The exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the exemplary computer system 1200. When executed, the instructions cause the exemplary computer system 1200 to perform specific actions and exhibit specific behavior, such as described herein.

The exemplary computer system 1200 may include an address/data bus 1210 that is configured to communicate information. Additionally, one or more data processing units, such as a processor 1220, are coupled with the address/data bus 1210. The processor 1220 is configured to process information and instructions. In an embodiment, the processor 1220 is a microprocessor. Alternatively, the processor 1220 may be a different type of processor, such as a parallel processor or a field programmable gate array.

The exemplary computer system 1200 is configured to utilize one or more data storage units. The exemplary computer system 1200 may include a volatile memory unit 1230 (e.g., random access memory ("RAM"), static RAM, dynamic RAM, etc.) coupled with the address/data bus 1210, wherein the volatile memory unit 1230 is configured to store information and instructions for the processor 1220. The exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with the address/data bus 1210, wherein the non-volatile memory unit 1240 is configured to store static information and instructions for the processor 1220. Alternatively, the exemplary computer system 1200 may execute instructions retrieved from an online data storage unit, such as in "cloud" computing. In an embodiment, the exemplary computer system 1200 also may include one or more interfaces, such as an interface 1250, coupled with the address/data bus 1210. The one or more interfaces are configured to enable the exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the exemplary computer system 1200 may include an input device 1260 coupled with the address/data bus 1210, wherein the input device 1260 is configured to communicate information and command selections to the processor 1220. In accordance with one embodiment, the input device 1260 is an alphanumeric input device, such as a keyboard, that may include alphanumeric and/or function keys. Alternatively, the input device 1260 may be an input device other than an alphanumeric input device. In an embodiment, the exemplary computer system 1200 may include a cursor control device 1270 coupled with the address/data bus 1210, wherein the cursor control device 1270 is configured to communicate user input information and/or command selections to the processor 1220. In an embodiment, the cursor control device 1270 is implemented utilizing a device such as a mouse, a track-ball, a track-pad, an optical tracking device, or a touchscreen. The foregoing notwithstanding, in an embodiment, the cursor control device 1270 is directed and/or activated via input from the input device 1260, such as in response to the use of special keys and key sequence commands associated with the input device 1260. In an alternative embodiment, the cursor control device 1270 is configured to be directed or guided by voice commands.

Figure 13:
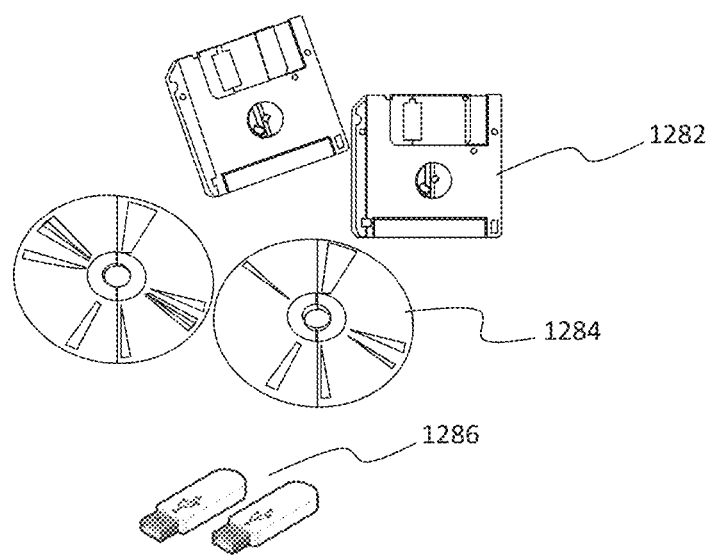
FIG. 13 is a depiction of some forms of non-volatile storage media.

In an embodiment, the exemplary computer system 1200 further may include one or more optional computer usable data storage devices, such as a storage device 1280, coupled with the address/data bus 1210. The storage device 1280 is configured to store information and/or computer executable instructions. In one embodiment, as shown in FIG. 13, the storage device 1280 is a storage device such as a magnetic or optical disk drive (e.g., hard disk drive ("HDD"), floppy diskette 1282, compact disc read-only memory ("CD-ROM") 1284, digital versatile disc ("DVD")), or flash memory (e.g., NAND flash in the form of a USB drive) 1286. Pursuant to one embodiment, a display device 1290 is coupled with the address/data bus 1210, wherein the display device 1290 is configured to display video and/or graphics. In an embodiment, the display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

The exemplary computer system 1200 is presented herein as an exemplary computing environment in accordance with an embodiment. However, the exemplary computer system 1200 is not strictly limited to being a computer system. For example, an embodiment provides that the exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating human-machine hybrid predictions of answers to forecasting problems, comprising:
   parsing, by a computer system, text of an individual forecasting problem (IFP) to identify a plurality of keywords;
   generating, by the computer system, one or more machine learning models based on the keywords;
   scraping, by the computer system, one or more data sources based on the keywords to collect scraped data relevant to the individual forecasting problem;
   training, by the computer system, the one or more machine learning models based on the scraped data;
   receiving, by the computer system, one or more machine predictions of answers to the individual forecasting problem from the one or more machine learning models based on the scraped data;
   providing, by the computer system via a user interface, the scraped data to one or more human participants;
   receiving, by the computer system via the user interface, one or more human predictions of answers to the individual forecasting problem from the one or more human participants;
   aggregating, by the computer system, the one or more machine predictions with the one or more human predictions to generate aggregated predictions;
   generating and outputting, by the computer system, a hybrid prediction based on weighting the one or more machine predictions and the one or more human predictions of the aggregated predictions;
   scraping, by the computer system, the one or more data sources based on the keywords to collect new scraped data relevant to the individual forecasting problem;
   detecting a significant change in the new scraped data compared to the scraped data; and
   in response to detecting the significant change in the new scraped data compared to the scraped data:
      alerting the one or more human participants regarding the new scraped data;
      displaying the new scraped data to the one or more human participants; and
      receiving one or more updated human predictions from the one or more human participants.

2. The method of claim 1, further comprising:
   providing the keywords to the human participants via the user interface; and
   receiving votes on the keywords from the human participants via the user interface,
   wherein the scraping the data sources is performed in accordance with the votes on the keywords.

3. The method of claim 1, further comprising displaying a machine prediction computed by a machine learning model of the one or more machine learning models to a human participant of the one or more human participants via the user interface.

4. The method of claim 1, further comprising:
   receiving one or more human participant rationales, each corresponding to one of the one or more human predictions; and
   displaying the one or more human participant rationales in the user interface in association with the corresponding human predictions.

5. The method of claim 1, further comprising, in response to detecting the significant change in the new scraped data compared to the scraped data:
   providing the new scraped data to further train the one or more machine learning models; and
   receiving one or more updated machine predictions from the one or more machine learning models based on the new scraped data.

6. The method of claim 1, wherein the individual forecasting problem is assigned to the one or more human participants of a plurality of human participants by:
   computing a participant skill vector for each of the plurality of human participants based on a plurality of prior responses to a plurality of prior individual forecasting problems;
   comparing the participant skill vector of each of the plurality of human participants to the individual forecasting problem to compute a plurality of participant-IFP match scores;
   identifying a plurality of participant-IFP match scores satisfying a threshold; and
   assigning the individual forecasting problem to the one or more human participants, wherein the participant-IFP match scores corresponding to the one or more human participants satisfy the threshold.

7. The method of claim 1, wherein the generating the hybrid prediction comprises:
   applying weights to the one or more human predictions and the one or more machine predictions to compute weighted human predictions and weighted machine predictions; and
   computing the hybrid prediction based on a combination of the weighted human predictions and the weighted machine predictions.

8. The method of claim 7, wherein the computing the hybrid prediction comprises supplying the one or more human predictions and the one or more machine predictions to an artificial neural network configured with the weights.

9. The method of claim 7, further comprising:
   receiving, by the computer system from the one or more machine learning models, one or more machine confidence scores, each of the machine confidence scores corresponding to one of the one or more machine predictions; and
   receiving, by the computer system via the user interface, from the one or more human participants, one or more participant confidence scores, each of the participant confidence scores corresponding to one of the one or more human predictions,
   wherein each of the weights associated with the one or more machine predictions is computed based on a corresponding one of the machine confidence scores, and
   wherein each of the weights associated with the one or more human predictions is computed based on a corresponding one of the participant confidence scores.

10. A computer system for generating human-machine hybrid predictions of answers to forecasting problems, comprising:
    one or more processors; and
    one or more computer memory units storing instructions that, when executed by the one or more processors, cause the one or more processors to:
        parse text of an individual forecasting problem (IFP) to identify a plurality of keywords;
        generate one or more machine learning models based on the keywords;
        scrape one or more data sources based on the keywords to collect scraped data relevant to the individual forecasting problem;
        train the one or more machine learning models based on the scraped data;
        receive one or more machine predictions of answers to the individual forecasting problem from the one or more machine learning models based on the scraped data;
        provide, via a user interface in communication with the one or more processors, the scraped data to one or more human participants;
        receive, via the user interface, one or more human predictions from the one or more human participants;
        aggregate the one or more machine predictions with the one or more human predictions to generate aggregated predictions; and
        generate and output a hybrid prediction based on weighting the one or more machine predictions and the one or more human predictions of the aggregated predictions,
    wherein the individual forecasting problem is assigned to the one or more human participants of a plurality of human participants by:
        computing a participant skill vector for each of the plurality of human participants based on a plurality of prior responses to a plurality of prior individual forecasting problems;
        comparing the participant skill vector of each of the plurality of human participants to the individual forecasting problem to compute a plurality of participant-IFP match scores;
        identifying a plurality of participant-IFP match scores satisfying a threshold; and
        assigning the individual forecasting problem to the one or more human participants, wherein the participant-IFP match scores corresponding to the one or more human participants satisfy the threshold.

11. The computer system of claim 10, wherein the one or more computer memory units further store instructions that, when executed by the one or more processors, cause the processor to:
    providing the keywords to the human participants via the user interface; and
    receiving votes on the keywords from the human participants via the user interface,
    wherein the scraping the data sources is performed in accordance with the votes on the keywords.

12. The computer system of claim 10, wherein the one or more computer memory units further store instructions that, when executed by the one or more processors, cause the processor to display a machine prediction computed by a machine learning model of the one or more machine learning models to a human participant of the one or more human participants via the user interface.

13. The computer system of claim 10, wherein the one or more computer memory units further store instructions that, when executed by the one or more processors, cause the processor to:
    receive one or more human participant rationales, each corresponding to one of the one or more human predictions; and
    display the one or more human participant rationales in the user interface in association with the corresponding human predictions.

14. The computer system of claim 10, wherein the one or more computer memory units further store instructions that, when executed by the one or more processors, cause the processor to:
    scrape the one or more data sources based on the keywords to collect new scraped data relevant to the individual forecasting problem; and
    detect a significant change in the new scraped data compared to the scraped data.

15. The computer system of claim 14, wherein the one or more computer memory units further store instructions that, when executed by the one or more processors, cause the processor to, in response to detecting the significant change in the new scraped data compared to the scraped data:
    provide the new scraped data to further train the one or more machine learning models; and
    receive one or more updated machine predictions from the one or more machine learning models based on the new scraped data.

16. The computer system of claim 14, wherein the one or more computer memory units further store instructions that, when executed by the one or more processors, cause the processor to, in response to detecting the significant change in the new scraped data compared to the scraped data:
    alert the one or more human participants regarding the new scraped data;
    display the new scraped data to the one or more human participants; and
    receive one or more updated human predictions from the one or more human participants.

17. The computer system of claim 10, wherein the instructions that cause the processor to generate the hybrid prediction comprise instructions that, when executed by the processor, cause the processor to:
    apply weights to the one or more human predictions and the one or more machine predictions to compute weighted human predictions and weighted machine predictions; and
    compute the hybrid prediction based on a combination of the weighted human predictions and the weighted machine predictions.

18. The computer system of claim 17, wherein the one or more computer memory units further store instructions that, when executed by the one or more processors, cause the processor to compute the hybrid prediction by supplying the one or more human predictions and the one or more machine predictions to an artificial neural network configured with the weights.

19. The computer system of claim 17, wherein the one or more computer memory units further store instructions that, when executed by the one or more processors, cause the processor to:
    receive, by the computer system from the one or more machine learning models, one or more machine confidence scores, each of the machine confidence scores corresponding to one of the one or more machine predictions; and receive, by the computer system via the user interface, from the one or more human participants, one or more participant confidence scores, each of the participant confidence scores corresponding to one of the one or more human predictions, wherein each of the weights associated with the one or more machine predictions is computed based on a corresponding one of the machine confidence scores, and wherein each of the weights associated with the one or more human predictions is computed based on a corresponding one of the participant confidence scores.

20. A non-transitory computer readable medium having program instructions stored thereon that, when executed by a processor, cause the processor to:

parse text of an individual forecasting problem (IFP) to identify a plurality of keywords;

generate one or more machine learning models based on the keywords;

scrape one or more data sources based on the keywords to collect scraped data relevant to the individual forecasting problem;

train the one or more machine learning models based on the scraped data;

receive one or more machine predictions of answers to the individual forecasting problem from the one or more machine learning models based on the scraped data;

provide, via a user interface in communication with the one or more processors, the scraped data to one or more human participants;

receive, via the user interface, one or more human predictions from the one or more human participants;

aggregate the one or more machine predictions with the one or more human predictions to generate aggregated predictions;

generate and output a hybrid prediction based on weighting the one or more machine predictions and the one or more human predictions of the aggregated predictions;

receive, from the one or more machine learning models, one or more machine confidence scores, each of the machine confidence scores corresponding to one of the one or more machine predictions; and receive, via the user interface, from the one or more human participants, one or more participant confidence scores, each of the participant confidence scores corresponding to one of the one or more human predictions, wherein each of the weights associated with the one or more machine predictions is computed based on a corresponding one of the machine confidence scores, and wherein each of the weights associated with the one or more human predictions is computed based on a corresponding one of the participant confidence scores.

* * * * *